(12) United States Patent
Kanagawa et al.

(10) Patent No.: US 10,033,229 B2
(45) Date of Patent: *Jul. 24, 2018

(54) POWER TRANSMISSION APPARATUS, POWER TRANSMISSION DEVICE AND POWER RECEPTION DEVICE FOR POWER TRANSMISSION APPARATUS

(71) Applicant: TOSHIBA TEC KABUSHIKI KAISHA, Shinagawa-ku, Tokyo (JP)

(72) Inventors: Masahiro Kanagawa, Mishima (JP); Masakazu Kato, Numazu (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,243

(22) Filed: May 31, 2017

(65) Prior Publication Data
US 2017/0264103 A1    Sep. 14, 2017

Related U.S. Application Data

(63) Continuation of application No. 14/328,862, filed on Jul. 11, 2014, now Pat. No. 9,698,605.

(30) Foreign Application Priority Data

Jul. 12, 2013   (JP) .................. 2013-146816

(51) Int. Cl.
    H01F 27/28       (2006.01)
    H01F 38/14       (2006.01)
    (Continued)

(52) U.S. Cl.
    CPC .......... H02J 50/12 (2016.02); H01F 27/2871 (2013.01); H01F 38/14 (2013.01); H02J 5/005 (2013.01); H02J 50/40 (2016.02)

(58) Field of Classification Search
    None
    See application file for complete search history.

(56) References Cited

U.S. PATENT DOCUMENTS 6,972,543 B1   12/2005   Wells
7,741,734 B2    6/2010   Joannopoulos et al.
(Continued)

FOREIGN PATENT DOCUMENTS

JP    2008-301553    12/2008
JP    2011-050140     3/2011

OTHER PUBLICATIONS

Uchida et al, Phase and Intensity Control of Multiple Coil Currents in Resonant Magnetic Coupling, 978-1-4673-1780-1, 2012 IEEE.
(Continued)

Primary Examiner — Jared Fureman
Assistant Examiner — Aqeel Bukhari
(74) Attorney, Agent, or Firm — Amin, Turocy & Watson LLP

(57) ABSTRACT

In a power transmission apparatus which transmits power from a power transmission device to a power reception device in a noncontact manner, the power transmission device includes a first main body supporting the power reception device on adjacent first and second surfaces, and a power transmission coil formed by planar coils which are respectively symmetrically disposed on the first and second surfaces with respect to an intersection between the first and second surfaces inside the first main body, and includes an extension region in which an occupation area of the coils gradually increases while becoming distant from a part close to the intersection. The power reception device includes a second main body that includes third and fourth surfaces which respectively face the first and second surfaces, and a (Continued)

power reception coil disposed in the second main body so as to correspond to the third and fourth surfaces.

17 Claims, 16 Drawing Sheets

(51) Int. Cl.
    *H02J 5/00*     (2016.01)
    *H02J 50/12*     (2016.01)
    *H02J 50/40*     (2016.01)

(56) References Cited

U.S. PATENT DOCUMENTS

| | | | |
|---|---|---|---|
| 7,825,543 | B2 | 11/2010 | Karalis et al. |
| 8,022,576 | B2 | 9/2011 | Joannopoulos et al. |
| 8,169,185 | B2 | 5/2012 | Partovi et al. |
| 9,698,605 | B2 * | 7/2017 | Kanagawa .............. H02J 5/005 |
| 2003/0006008 | A1 | 1/2003 | Horioka et al. |
| 2011/0049995 | A1 | 3/2011 | Hashiguchi |
| 2011/0316353 | A1 | 12/2011 | Ichikawa et al. |
| 2012/0112552 | A1 | 5/2012 | Baarman et al. |
| 2012/0146580 | A1 * | 6/2012 | Kitamura ................ H01F 38/14 |
| | | | 320/108 |
| 2013/0099586 | A1 | 4/2013 | Kato |
| 2014/0070622 | A1 * | 3/2014 | Keeling ................ H02J 50/50 |
| | | | 307/104 |
| 2014/0191584 | A1 | 7/2014 | Kato |

OTHER PUBLICATIONS

Non-Final Office Action for U.S. Appl. No. 14/328,862 dated Nov. 21, 2016.

* cited by examiner

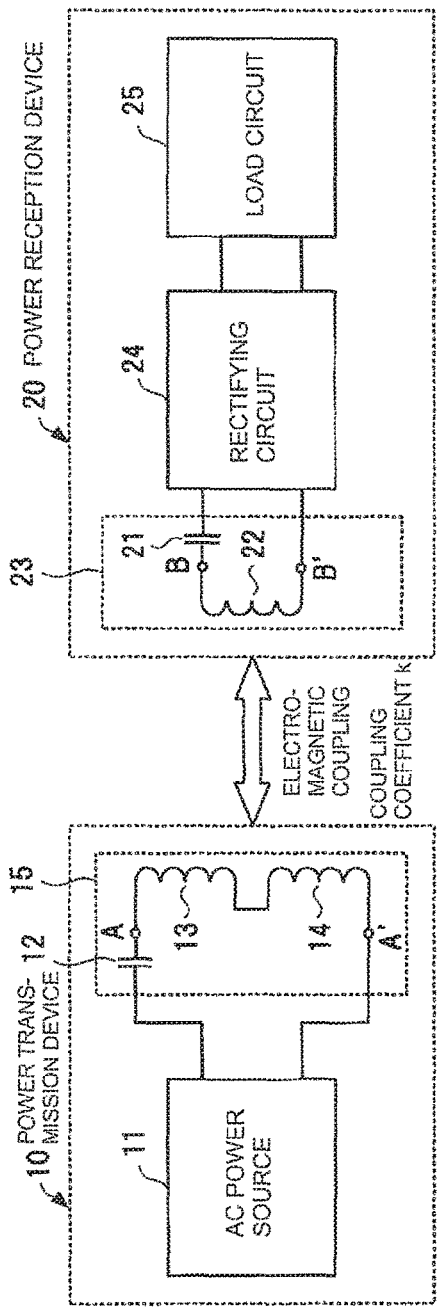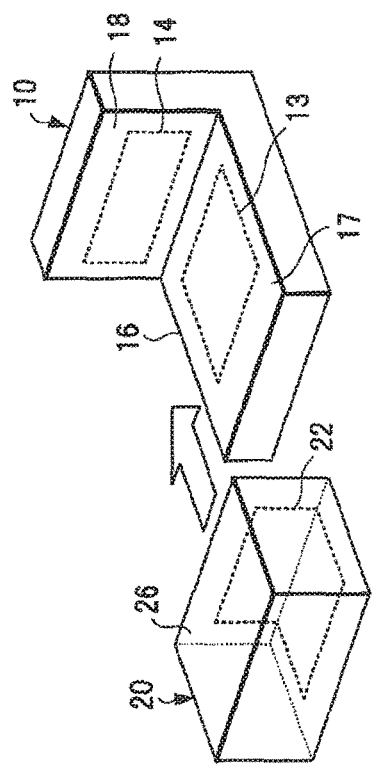

| POSITION OF POWER RECEPTION COIL 22 | DISTANCE H | FACING AREA (13-22) | DISTANCE W | FACING AREA (14-22) |
|---|---|---|---|---|
| P1 | H1 | S5a | W1 | S6a |
| P2 | H2 | S5b | W2 | S6b |
| P3 | H3 | S5c | W3 | S6c |

| POSITION OF POWER RECEPTION COIL 22 | DISTANCE H | FACING AREA (13-22) | DISTANCE W | FACING AREA (14-22) |
|---|---|---|---|---|
| P1 | A | C | A | C |
| P2 | B | B | B | B |
| P3 | C | A | C | A |

FIG. 9A

| POSITION OF POWER RECEPTION COIL 22 | DISTANCE H | FACING AREA (13-22) | DISTANCE W | FACING AREA (14-22) |
|---|---|---|---|---|
| P1 | H1 | S5a | W1 | S6a |
| P4 | H1 | S5b | W4 | S6a |
| P5 | H1 | S5c | W5 | S6a |

FIG. 9B

| POSITION OF POWER RECEPTION COIL 22 | DISTANCE H | FACING AREA (13-22) | DISTANCE W | FACING AREA (14-22) |
|---|---|---|---|---|
| P1 | B | C | A | B |
| P4 | B | B | B | B |
| P5 | B | A | C | B |

# POWER TRANSMISSION APPARATUS, POWER TRANSMISSION DEVICE AND POWER RECEPTION DEVICE FOR POWER TRANSMISSION APPARATUS

CROSS-REFERENCE TO RELATED APPLICATIONS

This application is a Continuation of application Ser. No. 14/328,862 filed on Jul. 11, 2014, the entire contents of which are incorporated herein by reference.

This application is based upon and claims the benefit of priority from Japanese Patent Application No. 2013-146816, filed Jul. 12, 2013, the entire contents of which are incorporated herein by reference.

FIELD

Embodiments described herein relate generally to a power transmission apparatus which transmits power from a power transmission device to a power reception device in a noncontact manner, and a power transmission device and a power reception device for the power transmission apparatus.

BACKGROUND

In recent years, an apparatus which transmits power in a noncontact manner has widely spread. A power transmission apparatus includes a power transmission device which transmits power, and a power reception device which receives the transmitted power. The power transmission apparatus transmits power from the power transmission device to the power reception device in a noncontact manner by using an electromagnetic induction system, a magnetic field resonance system, an electric field coupling method, or the like. The power reception device includes a driving circuit which drives the power reception device, and a load circuit such as a charging circuit of a secondary battery mounted in the power reception device.

When power (power of up to about several tens of watts) is transmitted to an electronic apparatus such as a portable terminal or a notebook PC in a noncontact manner, if the electromagnetic induction system or the electric field coupling method is used, the power transmission device and the power reception device are generally required to be substantially brought into close contact with each other in a transmittable region. On the other hand, if the magnetic field resonance system is used, the power transmission device and the power reception device are not required to be brought into close contact with each other, and, for example, even if the power reception device is separated from the power transmission device by about several cm, power can be transmitted. Therefore, the magnetic field resonance system has attracted attention since there is a degree of freedom of a position where the power reception device is placed, and convenience is excellent.

In the magnetic field resonance system, a resonance element formed by a coil and a capacitor provided in a power transmission device and a resonance element formed by a coil and a capacitor provided in a power reception device are coupled with each other, and thus power can be transmitted. Even in the electromagnetic induction system, a trial has been conducted to increase a power transmission distance not only by coupling a coil of a power transmission side and a coil of a power reception side with each other but also by providing resonance capacitors in both the power transmission side and the power reception side so as to resonantly couple elements of the power transmission side and the power reception side with each other. Therefore, differentiation between the magnetic field resonance system and the electromagnetic induction system has disappeared.

In addition, as a parameter which influences power transmission efficiency, there is a coupling coefficient k between resonance elements of a power transmission device and a power reception device. If a distance between the resonance elements of the power transmission device and the power reception device varies, the coupling coefficient k also typically varies. For example, if a distance between the resonance elements increases, the coupling coefficient k decreases. If the impedance of a circuit is fixed, the power transmission efficiency varies according to a variation in the coupling coefficient k.

As a method of maintaining the power transmission efficiency to be high even if the coupling coefficient k varies according to a variation in a distance between the resonance elements of the power transmission device and the power reception device, there is a technique in which an impedance adjusting unit which can vary impedance is provided, and impedance of the power transmission device or the power reception device is varied according to a variation in the coupling coefficient k (refer to JP-A-2011-50140).

However, in the technique disclosed in JP-A-2011-50140, there is a problem in that a new circuit for automatically controlling impedance is necessary when the coupling coefficient k varies, and control is complex.

DESCRIPTION OF THE DRAWINGS

FIGS. 1A and 1B are respectively a block diagram and a perspective view illustrating a configuration of a power transmission apparatus according to a first embodiment.

FIGS. 9A and 9B are diagrams illustrating a relationship between a distance and a facing area between the power transmission coil and the power reception coil.

DETAILED DESCRIPTION

Figure 2A:
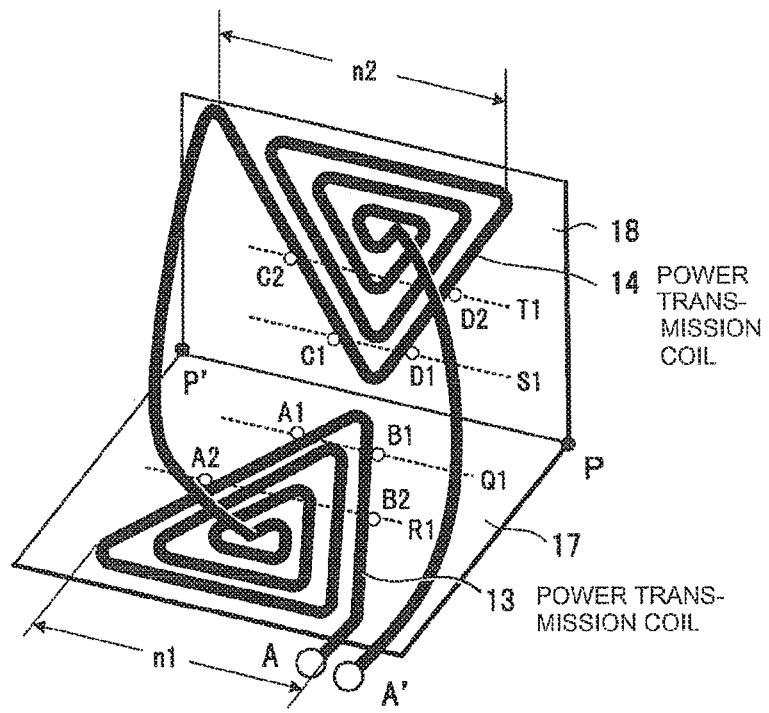
FIGS. 2A and 2B are perspective views schematically illustrating configurations of a power transmission coil and a power reception coil.

The embodiments provide a noncontact power transmission apparatus which minimizes a variation in a coupling coefficient k even if a distance between a power transmission coil of a power transmission device and a power reception coil of a power reception device varies.

According to an embodiment, there is provided a power transmission apparatus including a power transmission device that transmits power in a noncontact manner; and a power reception device that receives the power. The power transmission device includes a first main body that supports the power reception device on a first surface and a second surface adjacent to each other; a power transmission coil that is formed by planar coils which are respectively symmetrically disposed on the first surface and the second surface inside the first main body with respect to an intersection between the first surface and the second surface, and includes an extension region in which an occupation area of the coils gradually increases while becoming distant from a part close to the intersection; and an AC power source that supplies AC power to a resonance element including the power transmission coil. The power reception device includes a second main body that includes third and fourth surfaces which respectively face the first and second surfaces; a power reception coil that is disposed in the second main body so as to correspond to the third and fourth surfaces; and a rectifying circuit that rectifies AC power induced in a resonance element including the power reception coil.

Hereinafter, embodiments will be described with reference to the drawings. In addition, the same constituent elements are given the same reference numerals throughout all the drawings.

First Embodiment

FIG. 1A is a block diagram illustrating a configuration of a power transmission apparatus according to an embodiment. FIG. 1B is a perspective view schematically illustrating a power transmission device and a power reception device. As illustrated in FIG. 1A, the power transmission apparatus includes a power transmission device 10 which transmits power, and a power reception device 20 which receives the transmitted power. The power transmission device 10 and the power reception device 20 transmit power in a system using coupling, such as a magnetic field resonance system or an electromagnetic induction system. Hereinafter, description will be made of a case where power is transmitted in the magnetic field resonance system or the electromagnetic induction system.

The power transmission device 10 includes an AC power source 11 which generates power, and a resonance element 15 formed by a resonance capacitor 12 and power transmission coils 13 and 14. The AC power source 11 generates AC power of the same or substantially the same frequency as a self resonance frequency of the resonance element 15 for transmitting power, and supplies the AC power to the resonance element 15. The AC power source 11 includes an oscillation circuit which generates AC power of a desired frequency, and a power amplification circuit which amplifies an output of the oscillation circuit. Alternatively, the AC power source 11 may have a configuration of a switching power source, and may turn on and off switching elements by using an output of an oscillation circuit.

In addition, DC power is supplied to the AC power source 11 from an AC adaptor or the like which is provided outside the power transmission device 10. Alternatively, DC power may be applied to the AC power source 11 by providing AC 100 V to the power transmission device 10 from an external device, and providing an AC adaptor or an AC/DC conversion unit in the power transmission device 10.

The power reception device 20 includes a resonance element 23 formed by a resonance capacitor 21 and a power reception coil 22, a rectifying circuit 24 which converts DC into AC, and a load circuit 25. A self resonance frequency of the resonance element 23 for receiving power is the same or the substantially the same as the self resonance frequency of the resonance element 15 for transmitting power, and these resonance elements are electromagnetically coupled with each other, so that power is efficiently transmitted from the power transmission side to the power reception side.

The load circuit 25 is a circuit of an electronic apparatus such as a portable terminal or a portable printer, and power received by the power reception device 20 is used to operate the electronic apparatus or to charge a battery built into the electronic apparatus. Generally, the load circuit 25 is operated by DC power. In order to supply DC power to the load circuit 25, the rectifying circuit 24 which rectifies AC power induced in the resonance element 23 for receiving power so as to convert the AC power into DC power is provided.

In addition, the resonance capacitors 12 and 21 are not necessarily required to be formed by electronic components, and may use the inter-line capacitance of a coil depending on a shape of the coil or an inductance value of the coil. Further, the resonance capacitor 12 is disposed in series to the coils 13 and 14, and the resonance capacitor 21 is disposed in series to the coil 22, so as to form a serial resonance circuit, but the respective resonance capacitors may be disposed in parallel to the coils so as to form a parallel resonance circuit.

In the power transmission apparatus of FIG. 1A, as illustrated in FIG. 1B, the power reception coil 22 overlaps the power transmission coils 13 and 14 of the power transmission device 10, and thus power is transmitted to the power reception device 20. In other words, if a current flows through the power transmission coils 13 and 14, a magnetic field is generated in the power transmission coils 13 and 14. Meanwhile, a current flows through the power reception coil 22 due to an electromagnetic coupling action, and power can be obtained by rectifying the current.

In FIG. 1B, the power transmission device 10 includes a casing 16 which is an L-shaped main body on which the power reception device 20 is placed, and the power transmission coils 13 and 14 are disposed on L-shaped wall surfaces inside the casing 16 so as to be substantially perpendicular to each other along two surfaces 17 and 18. In addition, the power reception device 20 includes a casing 26 which is a square main body, and may be placed on the power transmission device 10. The power reception coil 22 which is folded at approximately 90 degrees is disposed on surfaces inside the casing 26 of the power reception device 20, facing the power transmission coils 13 and 14.

Figure 2B:
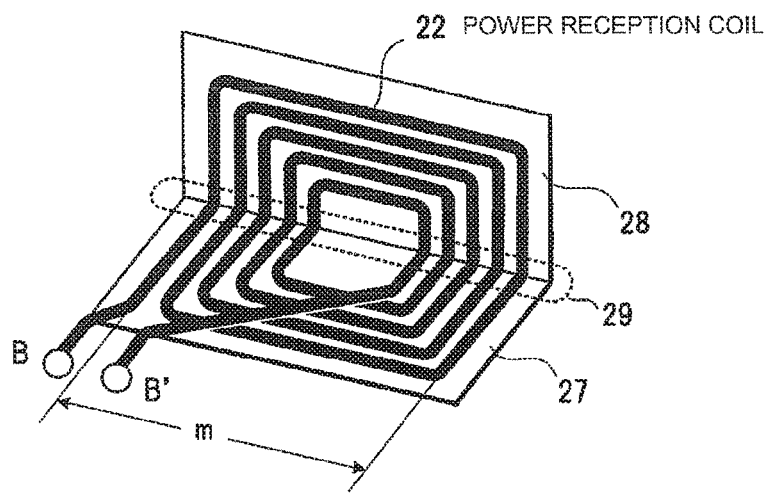

FIGS. 2A and 2B are perspective views schematically illustrating configurations of the power transmission coils 13 and 14 and the power reception coil 22. FIG. 2A illustrates the power transmission coils 13 and 14, and FIG. 2B illustrates the power reception coil 22. As illustrated in FIG. 2A, the power transmission coil 13 and the power transmission coil 14 are respectively disposed on the L-shaped two surfaces 17 and 18 (first and second surfaces) of the power transmission device 10 so as to be connected in series to each other.

End portions A and A' which are drawn from the power transmission coils 13 and 14 correspond to terminals A and A' of the power transmission device 10 of FIG. 1A. In addition, the end portions A and A' may be exchanged. Further, the power transmission coils 13 and 14 are ones in which a single copper line, a plurality of litz wires, or the like are wound in a planar shape along the two surfaces 17 and 18. Alternatively, a print coil formed on a rigid or flexible print board may be used. Here, the surfaces 17 and 18 are surfaces respectively including the power transmission coils 13 and 14, and an intersection of the surface 17 and the surface 18 is indicated by a straight line P-P'.

As illustrated in FIG. 2B, the power reception coil 22 has a shape in which a single coil is bent or folded at approximately 90 degrees, and is disposed so as to correspond to two surfaces 27 and 28 (third and fourth surfaces) of the power reception device 20. End portions B and B' drawn from the power reception coil 22 correspond to terminals B and B' of the power reception device 20 illustrated in FIG. 1A. In addition, the end portions B and B' may be exchanged with each other. Further, the power reception coil 22 may be one in which a single copper line, a plurality of litz wires, or the like are wound in a planar shape, and may be a print coil formed on a flexible print board.

If power is transmitted from the power transmission device 10 to the power reception device 20 in a noncontact manner, the power reception device 20 is placed on the casing 16 of the power transmission device 10 so that the power transmission coils 13 and 14 illustrated in FIG. 2A face and overlap the power reception coil 22 illustrated in FIG. 2B. The power transmission device 10 supports the power reception device 20 with the first surface 17 and the second surface 18 adjacent to each other.

Next, a specific configuration of the power transmission coils 13 and 14 will be described. As illustrated in FIG. 2A, the power transmission coils 13 and 14 are inverted triangular and planar coils which are symmetrically disposed on the surface 17 and the surface 18 with respect to the intersection (the straight line P-P') of the surfaces 17 and 18, and the power transmission coils 13 and 14 are connected in series to each other.

In FIG. 2A, straight lines Q1 and R1 are assumed which are parallel to the straight line P-P' and are spaced apart therefrom with predetermined gaps in the surface 17 including the power transmission coil 13. It is assumed that the straight lines Q1 and R1 are located at positions intersecting the power transmission coil 13, and the straight line R1 is located at a position which is more distant than the straight line Q1 from the straight line P-P'. In addition, if intersections between the straight line Q1 and an outer edge portion of the power transmission coil 13 are A1 and B1, and intersections between the straight line R1 and the outer edge portions of the power transmission coil 13 are A2 and B2, the power transmission coil 13 is formed so that a line segment connecting the intersections A1 and B1 and a line segment connecting the intersections A2 and B2 satisfy a relationship of the line segment (A1-B1)<the line segment (A2-B2). In other words, the power transmission coil 13 has a configuration in which a width of the coil increases as the coil becomes more distant from the straight line P-P'.

Similarly, straight lines S1 and T1 are assumed which are parallel to the straight line P-P' and are spaced apart therefrom with predetermined gaps in the surface 18 including the power transmission coil 14. It is assumed that the straight lines S1 and T1 are located at positions intersecting the power transmission coil 14, and the straight line T1 is located at a position which is more distant than the straight line S1 from the straight line P-P'. In addition, if intersections between the straight line S1 and an outer edge portion of the power transmission coil 14 are C1 and D1, and intersections between the straight line T1 and the outer edge portions of the power transmission coil 14 are C2 and D2, the power transmission coil 13 is formed so as to satisfy a relationship of a line segment (C1-D1)<a line segment (C2-D2). In other words, in the same manner as the power transmission coil 13, the power transmission coil 14 has a configuration in which a width of the coil increases as the coil becomes more distant from the straight line P-P'.

Figure 3:
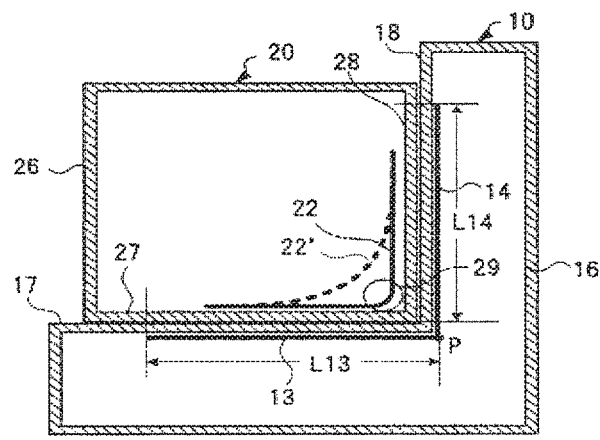
FIG. 3 is a cross-sectional view illustrating a positional relationship between the power transmission coil and the power reception coil.

FIG. 3 is a cross-sectional view illustrating a positional relationship between the power transmission coils 13 and 14 and the power reception coil 22 when the power reception device 20 is placed on the power transmission device 10. The power transmission coils 13 and 14 are disposed along the two adjacent surfaces 17 and 18 of the power transmission device 10, and the power reception coil 22 is disposed so as to correspond to the two surfaces 27 and 28 of the power reception device 20. The surfaces 17 and 18 are surfaces respectively including the power transmission coils 13 and 14, and a part where the surface 17 intersects the surface 18 is indicated by the straight line P-P' of FIGS. 2A and 3.

As illustrated in FIG. 3, the power transmission device 10 includes the casing 16 which is thick and is made of, for example, a resin. A thickness of the surface 17 or the surface 18 is required to have strength which is large enough to support the power reception device 20. Although different depending on a weight of the power reception device 20, if the power reception device 20 such as a portable apparatus with a weight of about 500 g to 1 kg is placed on the surface 17, the surface 17 made of a normal resin is required to have a thickness of about 2 mm to 3 mm. Typically, the power transmission coils 13 and 14 are respectively disposed inside the surfaces 17 and 18 of the casing 16 in consideration of safety or durability.

The power reception device 20 includes the casing 26, and the power reception coil 22 is disposed along the surfaces 27 and 28 of the casing 26 facing the power transmission coils 13 and 14. In an example illustrated in FIG. 3, the power reception coil 22 is provided inside the casing 26 along the surfaces 27 and 28, but is not limited to the inside of the casing 26. For example, the power reception coil 22 may be provided outside the casing 26, and an insulation process for covering the power reception coil 22 with, for example, a protective film may be performed.

The power reception coil 22 is one in which a single coil is bent or folded as illustrated in FIG. 2B, but a folded part 29 may be at an angle in which the surface 27 intersects the surface 28, that is, at a right angle. In addition, the folded part 29 may be bent with a proper arc as illustrated in FIG. 3, and may be bent with a smooth arc as indicated by a dotted line 22'.

Next, an operation of the power transmission apparatus according to the first embodiment will be described. The positional relationship between the power transmission coils 13 and 14 and the power reception coil 22 illustrated in FIG. 3 illustrates a normal usage state, that is, a state in which the power reception device 20 which is a charged portable apparatus is placed so as to be the closest to the power transmission device 10 which is a charging cradle. For example, if a portable apparatus is placed on a charging cradle in a state of being put into a case such as a soft case or a carrying case for carrying or protecting the portable apparatus, a distance between the power transmission coils 13 and 14 and the power reception coil 22 increases by the thickness of the case.

In the related art, if a distance between the power transmission coil and the power reception coil varies, a coupling coefficient k varies. Thus, as long as a circuit constant is not changed, an amount of power which can be received by the power reception device 20 or power transmission efficiency also varies. In the related art, generally, an amount of power which can be received is the maximum at a specific distance, and the amount of power which can be received is reduced if the specific distance varies. In the first embodiment, since the coupling coefficient k does not almost vary even if a distance between the coils varies, the amount of power which can be received or the power transmission efficiency does not almost vary. Hereinafter, the reason will be described.

Figure 4:
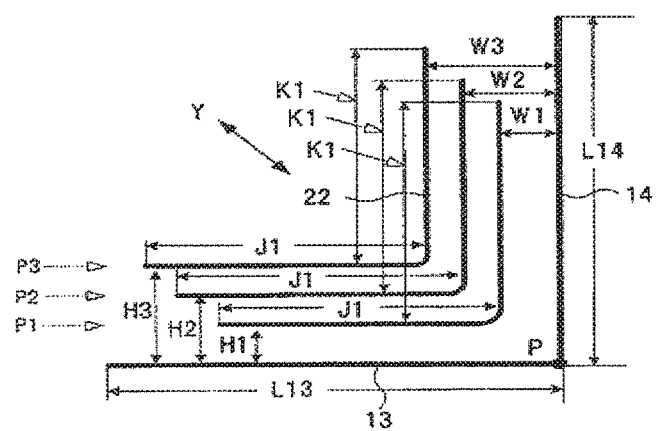
FIG. 4 is a diagram illustrating operation when positions of the power transmission coil and the power reception coil vary.

FIG. 4 is a diagram illustrating an influence on the coupling coefficient k if a distance between the power transmission coils 13 and 14 and the power reception coil 22 varies. In FIG. 4, only a positional relationship between the power transmission coils 13 and 14 and the power reception coil 22 is illustrated, and the casings and the like of the power transmission device 10 and the power reception device 20 are not illustrated. FIG. 4 illustrates a state in which a position of the power reception coil 22 is changed to positions indicated by P1, P2, and P3.

Figure 5A:
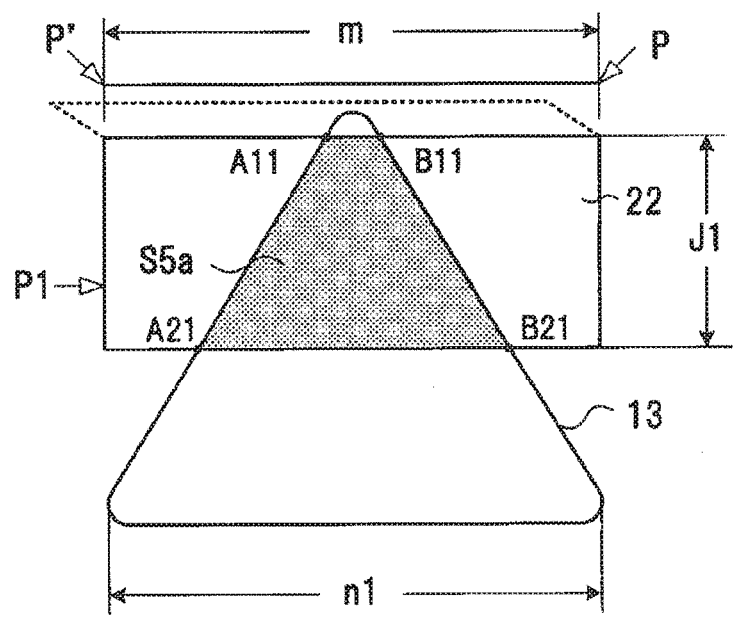
FIG. 5A is a plan view illustrating a facing area of the power transmission coil and the power reception coil.
Figure 5B:
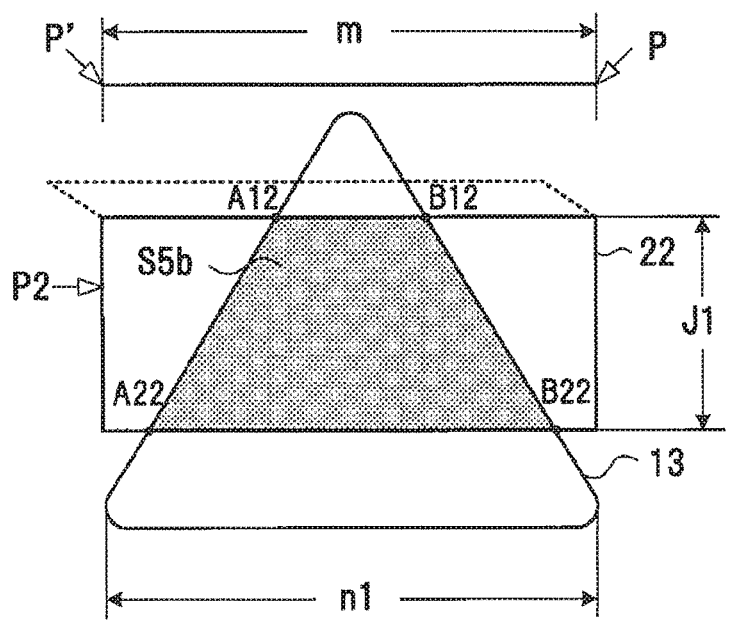
FIG. 5B is a plan view illustrating a variation in the facing area when a position of the power reception coil varies.
Figure 5C:
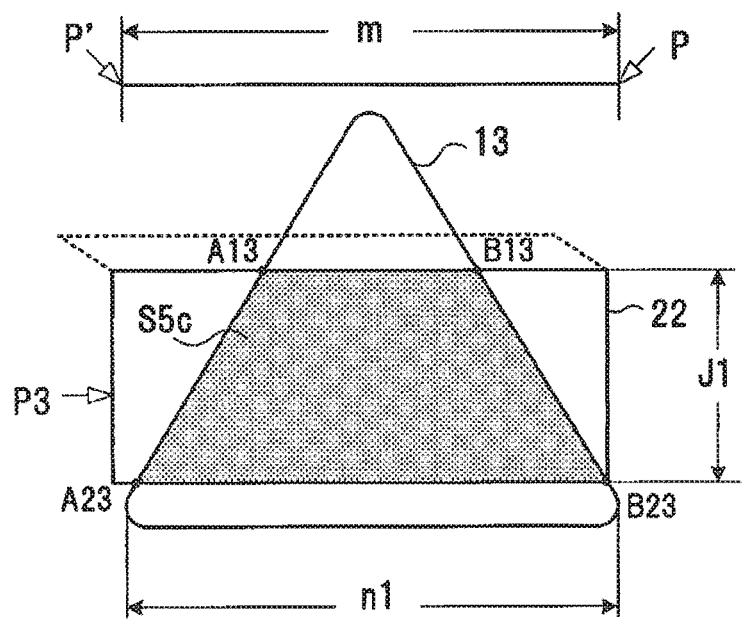
FIG. 5C is a plan view illustrating a variation in the facing area when a position of the power reception coil further varies.

In addition, FIGS. 5A to 5C are schematic plan views of the power transmission coil 13, and are diagrams illustrating a positional relationship between the power transmission coil 13 and the power reception coil 22 facing the power transmission coil 13. FIGS. 5A to 5C illustrate a case where a position of the power reception coil 22 is changed to the positions of P1, P2, and P3 as illustrated in FIG. 4. Further, at the positions of P1, P2, and P3, distances between the power transmission coil 13 and the power reception coil 22 are respectively H1, H2, and H3 (FIG. 4), but variations in a height direction are not illustrated in FIGS. 5A to 5C.

In addition, for convenience of description, the maximum width n1 of the power transmission coil 13 is illustrated to be approximately the same as the maximum width m of the power reception coil 22, but the widths n1 and m of the coils are not necessarily required to be the same as each other.

As illustrated in FIG. 4, if the power reception device 20 is directly placed on the power transmission device 10, or the power reception device 20 is put into a case and is placed on the power transmission device 10, a position of the power reception coil 22 is changed in the direction of an arrow Y. For example, description will be made of a case where a position of the power reception coil 22 is changed to P1, P2, and P3 with respect to the power transmission coils 13 and 14 and thus a relative distance is changed.

In FIGS. 4 and 5A, a part where the power reception coil 22 faces the power transmission coil 13 is considered. At the position P1, the distance H1 (in the vertical direction) between the power transmission coil 13 and the power reception coil 22 is the shortest among the positions P1 to P3. Here, an area of the part where the power transmission coil 13 faces the power reception coil 22 is obtained.

A length of the power reception coil 22 facing the power transmission coil 13 is set to J1. Two points of the outer edge portion of the power transmission coil 13 at a location which is the closest to the straight line P-P' in the part where the power transmission coil 13 faces the power reception coil 22 are respectively set to points A11 and B11. In addition, two points of the outer edge portion of the power transmission coil 13 at a location which is the most distant from the straight line P-P' in the part where the power transmission coil 13 faces the power reception coil 22 are respectively set to points A21 and B21. The part where the power transmission coil 13 faces the power reception coil 22 is a trapezoid which connects the points A11, B11, B21, and A21, and an area S5a thereof is $S5a = J1 \times (A11\_B11 + A21\_B21)/2$ (where A11_B11 is a distance between the points A11 and B11, and A21_B21 is a distance between the points A21 and B21).

Similarly, at the positions P2 and P3, the distances (in the vertical direction) between the power transmission coil 13 and the power reception coil 22 are respectively H2 and H3, and, as illustrated in FIGS. 5B and 5C, parts where the power transmission coil 13 faces the power reception coil 22 respectively have a trapezoidal shape indicated by A12, B12, B22, and A22, and a trapezoidal shape indicated by A13, B13, B23, and A23. Areas S5b and S5c of the facing parts are respectively $S5b = J1\lambda(A12\_B12 + A22\_B22)/2$, and $S5c = J1\lambda(A13\_B13 + A23\_B23)/2$. Here, if the areas S5a, S5b and S5c of the trapezoids are compared with each other, this leads to a relationship of $S5a < S5b < S5c$.

Figure 6A:
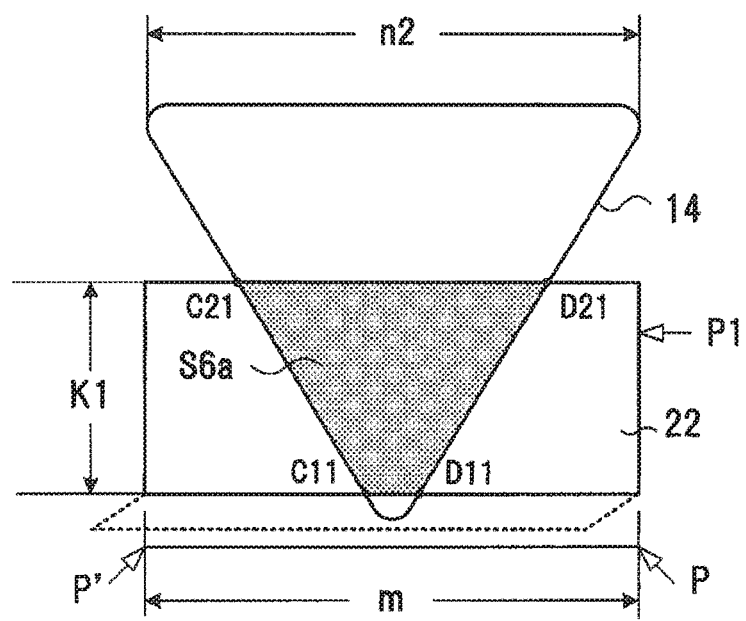
FIG. 6A is a front view illustrating the facing area of the power transmission coil and the power reception coil.

Next, a part where the power reception coil 22 faces the power transmission coil 14 will be described with reference to FIG. 4 and FIGS. 6A to 6C. FIG. 6A is a front view of the power transmission coil 14 if the power reception coil 22 is located at the position P1. If the power reception coil 22 is located at the position P1, a distance (in the horizontal direction) W1 between the power transmission coil 14 and the power reception coil 22 is the shortest among the positions P1 to P3.

Here, an area of the part where the power transmission coil 14 faces the power reception coil 22 is obtained. In the positional relationship illustrated in FIG. 4, a length of the power reception coil 22 facing the power transmission coil 14 is set to K1. Two points of the outer edge portion of the power transmission coil 14 at a location which is the closest to the straight line P-P' in the part where the power transmission coil 14 faces the power reception coil 22 are respectively set to points C11 and D11. Two points of the outer edge portion of the power transmission coil 14 at a location which is the most distant from the straight line P-P' in the part where the power transmission coil 14 faces the power reception coil 22 are respectively set to points C21 and D21. The part where the power transmission coil 14 faces the power reception coil 22 is a trapezoid which connects the points C11, D11, D21, and C21, and an area S6a thereof is S6a=K1λ(C11_D11+C21_D21)/2 (where C11_D11 is a distance between the points C11 and D11, and C21_D21 is a distance between the points C21 and D21).

Figure 6B:
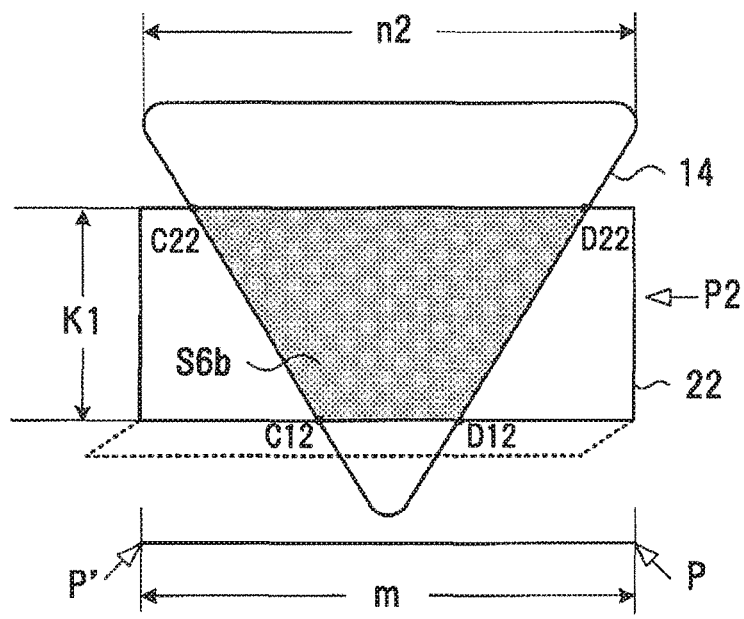
FIG. 6B is a front view illustrating a variation in the facing area when a position of the power reception coil varies.
Figure 6C:
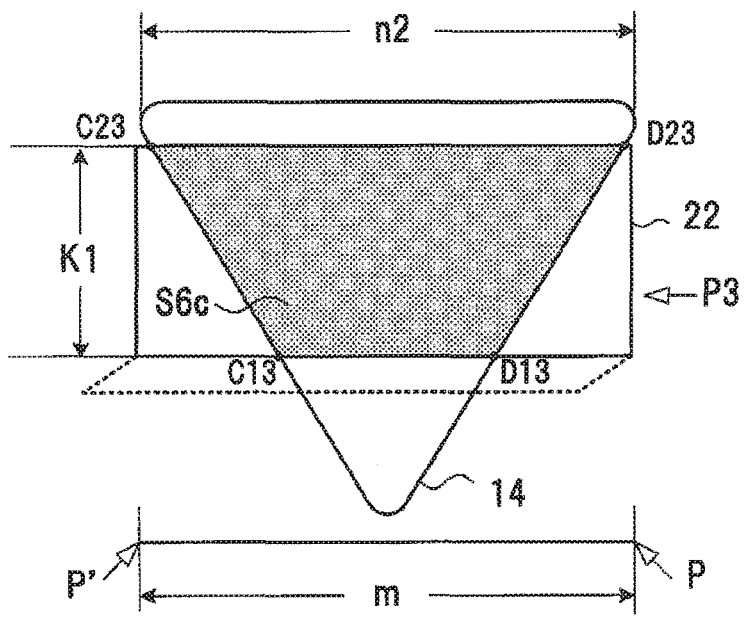
FIG. 6C is a front view illustrating a variation in the facing area when a position of the power reception coil further varies.

Similarly, at the positions P2 and P3, distances (in the horizontal direction) between the power transmission coil 14 and the power reception coil 22 are respectively W2 and W3, and, as illustrated in FIGS. 6B and 6C, areas S6b and S6c of parts where the power transmission coil 14 faces the power reception coil 22 respectively are S6b=K1×(C12_D12+C22_D22)/2, and S6c=K1λ(C13_D13+C23_D23)/2. Here, if the areas S6a, S6b and S6c of the trapezoids are compared with each other, this leads to a relationship of S6a<S6b<S6c.

In other words, the power transmission coils 13 and 14 are planar coils which are respectively symmetrically disposed on the first surface 17 and the second surface 18 inside the casing 16 with respect to the intersection (P-P') between the first surface 17 and the second surface 18, and include extension regions in which an occupation area of the coil gradually increases while becoming distant from a part close to the intersection (P-P').

Figures 7A, 7B, 8:
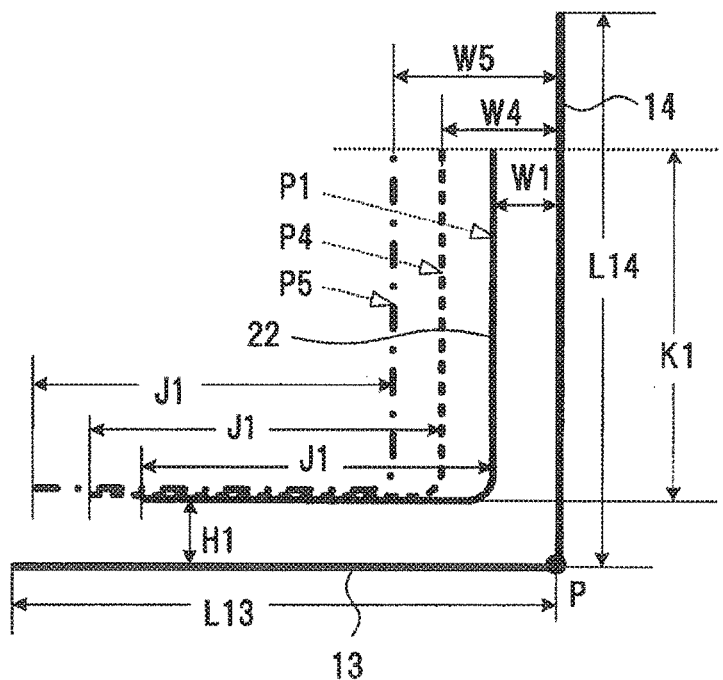
FIGS. 7A and 7B are diagrams illustrating a distance and a facing area when a position of the power reception coil varies.
FIG. 8 is a diagram illustrating another operation when positions of the power transmission coil and the power reception coil vary.

FIGS. 7A and 7B are tables in which the above-described relationships are summarized. FIG. 7A illustrates a distance H between the power transmission coil 13 and the power reception coil 22, a facing area (13-22) between the power transmission coil 13 and the power reception coil 22, a distance W between the power transmission coil 14 and the power reception coil 22, and a facing area (14-22) between the power transmission coil 14 and the power reception coil 22.

Here, in relation to the distance H and the distance W, relationships of H1<H2<H3 and W1<W2<W3 are given.

Generally, the coupling coefficient k tends to increase as a distance between coils becomes shorter, and an area of facing coils becomes larger. Therefore, although not qualitative, if a distance and a facing area at the position P2 of the power reception coil 22 are used as a reference (B), an element in which the coupling coefficient k increases is denoted by (A), and an element in which the coupling coefficient k decreases is denoted by (C), FIG. 7A can be rewritten into FIG. 7B.

As illustrated in FIG. 7B, if the power reception coil 22 is located at the position P1, there is an action by which the distances H and W become short, and thus the coupling coefficient k increases, but there is an action by which the facing areas (13-22) and (14-22) become small, and thus the coupling coefficient k decreases. As a result, the actions cancel out each other, and thus the coupling coefficient k does not almost vary as compared with cases where the power reception coil 22 is located at the position P2.

In addition, if the power reception coil 22 is located at the position P3, there is an action by which the distances H and W become long, and thus the coupling coefficient k decreases, but, there is an action by which the facing areas (13-22) and (14-22) become large, and thus the coupling coefficient k increases. As a result, the actions cancel out each other, and thus the coupling coefficient k does not almost vary as compared with cases where the power reception coil 22 is located at the position P2. In other words, if a distance between the power transmission coils 13 and 14 and the power reception coil 22 varies, a facing area between the power transmission coils 13 and 14 and the power reception coil 22 complementarily varies.

Therefore, as illustrated in FIG. 4, a power transmission apparatus can be provided in which the coupling coefficient k does not almost vary even if a position of the power reception coil 22 is changed to the positions such as P1, P2, and P3 with respect to the power transmission coils 13 and 14.

Next, as illustrated in FIG. 8, description will be made of a variation in the coupling coefficient k when the power reception coil 22 is moved in the horizontal direction along the power transmission coil 13. The distance (in the vertical direction) H1 between the power reception coil 22 and the power transmission coil 13 is set to be constant.

FIG. 9A illustrates a distance H between the power transmission coil 13 and the power reception coil 22, a facing area (13-22) between the power transmission coil 13 and the power reception coil 22, a distance W between the power transmission coil 14 and the power reception coil 22, and a facing area (14-22) between the power transmission coil 14 and the power reception coil 22, when the power reception coil 22 is moved from a position P1 which is the closest to the power transmission coils 13 and 14 to positions P4 and P5 along the power transmission coil 13. In addition, the position P1 of the power reception coil is the same as the position P1 illustrated in FIG. 4.

Here, for convenience of description, distances W4 and W5 between the power reception coil 22 and the power transmission coil 14 at the positions P4 and P5 are assumed to be the same as the distances W2 and W3 illustrated in FIG. 4. In this case, a facing area between the power reception coil 22 and the power transmission coil 13 is the same as the area S5a illustrated in FIG. 5A when the power reception coil 22 is located at the position P1, and are respectively the same as the areas S5b and S5c illustrated in FIGS. 5B and 5C when the power reception coil 22 is located at the positions P4 and P5.

Since the power reception coil 22 is moved in a direction of becoming distant from the point P along the power transmission coil 13, the distance H in the vertical direction is constant as H1, and the facing area (14-22) is the same as the area S6a illustrated in FIG. 6A and is also constant.

If the distances H and W and the facing areas (13-22 and 14-22) at the position P4 of the power reception coil 22 are used as a reference (B), an element in which the coupling coefficient k increases is denoted by (A), and an element in which the coupling coefficient k decreases is denoted by (C), FIG. 9A can be rewritten into FIG. 9B on the basis of relationships of S5a<S5b<S5c and W1<W4(=W2)<W5 (=W3).

As illustrated in FIG. 9B, if the power reception coil 22 is located at the position P1, the facing area (13-22) is small, and thus the coupling coefficient k decreases, but the distance W is short, and thus the coupling coefficient k increases. As a result, canceling-out occurs, and the coupling coefficient k does not almost vary even if a position of the power reception coil 22 is changed. In addition, if the power reception coil 22 is located at the position P5, the facing area (13-22) is large, and thus the coupling coefficient k increases, but the distance W is long, and thus the coupling coefficient k decreases. As a result, canceling-out occurs, and thus the coupling coefficient k does not almost vary even if a position of the power reception coil 22 is changed.

Therefore, as illustrated in FIG. 8, a power transmission apparatus can be provided in which the coupling coefficient k does not almost vary even if a position of the power reception coil 22 is changed to the positions such as P1, P4, and P5 with respect to the power transmission coils 13 and 14.

Similarly, when the power reception coil 22 is moved in the vertical direction along the power transmission coil 14, if the distance H is shorter, the coupling coefficient k increases, but the facing area (14-22) between the power reception coil 22 and the power transmission coil 14 is reduced. As a result, canceling-out occurs, and thus the coupling coefficient k does not almost vary even if a position of the power reception coil 22 is changed. In addition, if the distance H is longer, the coupling coefficient k decreases, but the facing area (14-22) becomes larger, and thus the coupling coefficient k increases. As a result, canceling-out occurs, and thus the coupling coefficient k does not almost vary even if a position of the power reception coil 22 is changed.

As described above, according to the first embodiment, a power transmission apparatus can be provided in which the coupling coefficient k does not almost vary even if a position of the power reception coil 22 is moved in the horizontal direction and vertical direction, or in the horizontal direction or in the vertical direction with respect to the power transmission coils 13 and 14.

Next, with reference to FIGS. 10A to 12, description will be made of a result in which a coupling coefficient k of the related art and a coupling coefficient k of the power transmission apparatus according to the first embodiment are actually measured and compared with each other.

Figure 10A:
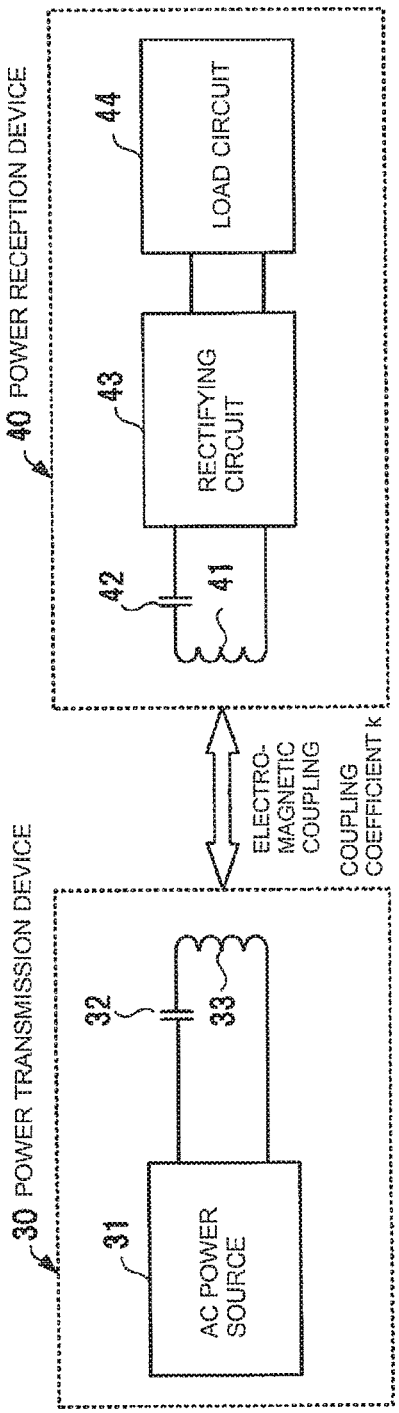
FIGS. 10A and 10B are respectively a block diagram and a configuration of a coil illustrating a configuration of a general power transmission apparatus.
Figure 10B:
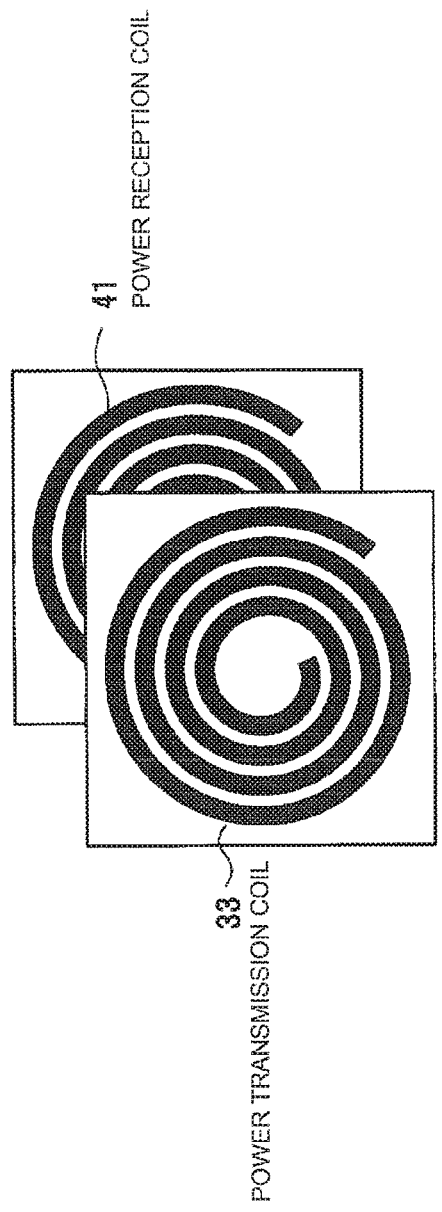

FIG. 10A illustrates a configuration of a general power transmission apparatus which transmits power in a noncontact manner. A power transmission device 30 includes an AC power source 31, a resonance capacitor 32, a power transmission coil 33, and the like. In addition, a power reception device 40 includes a power reception coil 41, a resonance capacitor 42, a rectifying circuit 43, a load circuit 44, and the like. FIG. 10B illustrates examples of the power transmission coil 33 and the power reception coil 41, and, for example, the power transmission coil 33 and the power reception coil 41 which are spirally formed in a plate shape are disposed so as to face each other.

The coupling coefficient k may be obtained according to Equation (1) by actually measuring self-inductance Lopen and leakage inductance Lsc.

[Equation 1]

$$k = \sqrt{1 - \frac{Lsc}{Lopen}} \quad (1)$$

Figure 11:
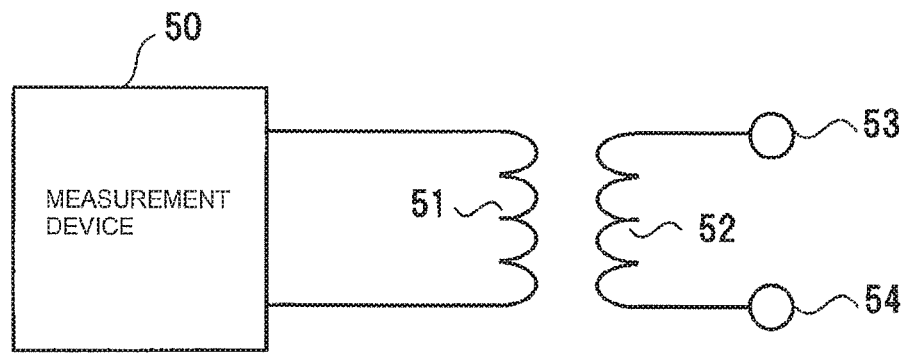
FIG. 11 is a diagram illustrating a measurement system of a coupling coefficient k in the power transmission apparatus.

FIG. 11 is a diagram illustrating a measurement system of the coupling coefficient k in the power transmission apparatus. As illustrated in FIG. 11, one coil 51 is connected to a measurement device 50 such as an LCR meter, and the self-inductance Lopen is measured with the measurement device 50 when both ends 53 and 54 of the other coil 52 are opened, and the leakage inductance Lsc is measured when both the ends 53 and 54 are short-circuited, thereby obtaining the coupling coefficient k according to Equation (1).

Figure 12:
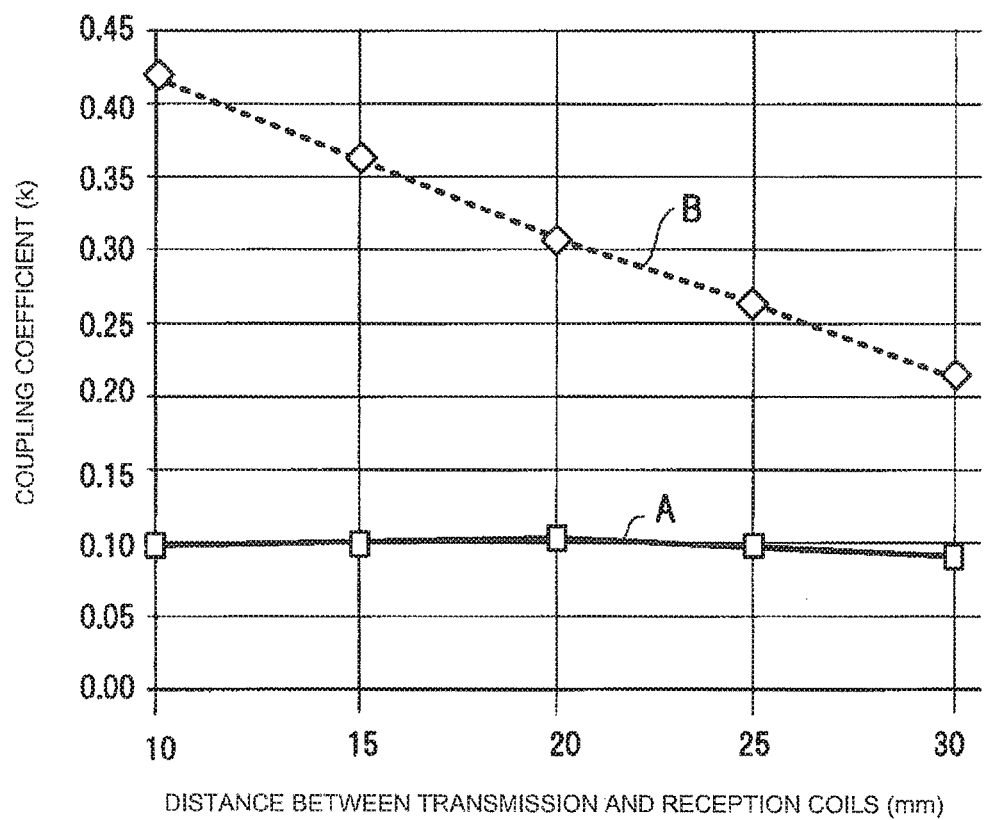
FIG. 12 is a characteristic diagram illustrating a relationship between a distance between transmission and reception coils and a coupling coefficient k in the first embodiment and a general example.

A line B of FIG. 12 indicates a measurement result of the coupling coefficient k when a gap between the plate-shaped power transmission coil 33 and power reception coil 41 illustrated in FIG. 10B, that is, a distance between transmission and reception coils is varied. Here, as used sizes of the power transmission coil 33 and the power reception coil 41, an exterior dimension of the spiral coil pattern is about 100 mm in diameter, and a value of inductance which is measured at 100 kHz is about 2.5 µH.

The coupling coefficient k is 0.42 if a distance between the transmission and reception coils is 10 mm, the coupling coefficient k decreases as a distance between the transmission and reception coils becomes longer, and the coupling coefficient k decreases to 0.21 if a distance between the transmission and reception coils is 30 mm. The coupling coefficient k varies in a range of 0.315±33% if a distance between the transmission and reception coils is in a range of 10 mm to 30 mm. The fact that the coupling coefficient k varies in a range of ±33% when a distance between the transmission and reception coils varies by about 20 mm (corresponding to a distance which is 20% of the diameter of the coil) is considered to be very normal in light of a ratio (20%) of the distance (20 mm) between the transmission and reception coils to the diameter (100 mm) of the coil.

On the other hand, a solid line A of FIG. 12 indicates a result of measuring a variation in the coupling coefficient k when the power transmission coils 13 and 14 and the power reception coil 22 of the power transmission apparatus according to the first embodiment are used. The power transmission coils 13 and 14 have a shape as illustrated in FIG. 2A, and spiral coil patterns are formed, for example, by using a print board, each exterior dimension of the coil patterns is about 120 mm×90 mm, and widths of the coils are n1=n2=120 mm. Each inductance value measured at 100 kHz is about 0.87 µH, and a total of about 1.74 µH is obtained when the power transmission coil 13 and the power transmission coil 14 are connected in series to each other.

The power reception coil 22 has a shape as illustrated in FIG. 2B, and a spiral coil pattern is formed, for example, by using a flexible board. An exterior dimension of the coil pattern is about 100 mm×100 mm, and the power reception coil 22 is folded at a substantially right angle so that each of two surfaces of the power reception coil 22 along the two surfaces 27 and 28 of the power reception device is about 50 mm×100 mm. The folded part 29 has a proper R (arc). In addition, the width m of the power reception coil 22 of FIG. 2B is 100 mm. FIG. 3 illustrates a cross-sectional view when the power transmission coils 13 and 14 are disposed, and the surfaces 17 and 18 including the power transmission coils 13 and 14 are in contact with the straight line P-P'. However, conductor portions of the power transmission coils 13 and 14 are not in contact with each other via the straight line P-P'. In addition, each of lengths L13 and L14 of the power transmission coil 13 and the power transmission coil 14 is about 90 mm.

For convenience of description, a direction in which the power reception coil 22 is moved is set to the Y direction illustrated in FIG. 4, and the distances H1, H2 and H3 between the power reception coil 22 and the power transmission coil 13 are assumed to be the same as the distances W1, W2 and W3 between the power reception coil 22 and the power transmission coil 14. Therefore, if a distance between the transmission and reception coils is 10 mm, both the distances H and W are 10 mm, and if a distance between the transmission and reception coils is 30 mm, both the distances H and W are 30 mm.

As in the result indicated by the solid line A of FIG. 12, in the configuration of the present embodiment, the coupling coefficient k only varies in a range of 0.105 to 0.083 and thus varies in a range of 0.094±12% even if a distance between the transmission and reception coils varies in a range of 10 mm to 30 mm. Therefore, it can be seen that a variation rate of the coupling coefficient k is about ⅓ of the characteristic B of the related art, and thus the variation rate of the coupling coefficient k is considerably reduced.

As mentioned above, since a characteristic is obtained in which a variation in the coupling coefficient k is very small even if a distance between the power transmission coils 13 and 14 and the power reception coil 22 varies, a variation in power which can be obtained by the power reception device 20 can be reduced, and a variation in the power transmission efficiency can also be reduced.

In the related art, a control circuit which changes a circuit constant according to a variation in the coupling coefficient k is necessary, but, in the first embodiment, the control circuit is not necessary, and a very stable power reception characteristic with respect to a variation in a distance between the coils can be obtained, and high power transmission efficiency can be maintained.

Second Embodiment

In the first embodiment, each of exterior shapes of the power transmission coils 13 and 14 is a substantially triangular shape as illustrated in FIG. 2A as an example. A reduction of the variation in the coupling coefficient k regardless of a variation in a distance between the power transmission coil and the power reception coil can be realized by forming a shape in which the power transmission coils 13 and 14 extend while becoming distant from the straight line P-P' at which the surfaces 17 and 18 including the power transmission coil 13 and the power transmission coil 14 intersect each other as described in the first embodiment.

However, an extending shape such as a triangular shape is not necessarily required to be employed. Particularly, an extending shape is not necessarily required to be employed at a part which is distant from the straight line P-P' to some degree.

Figure 13:
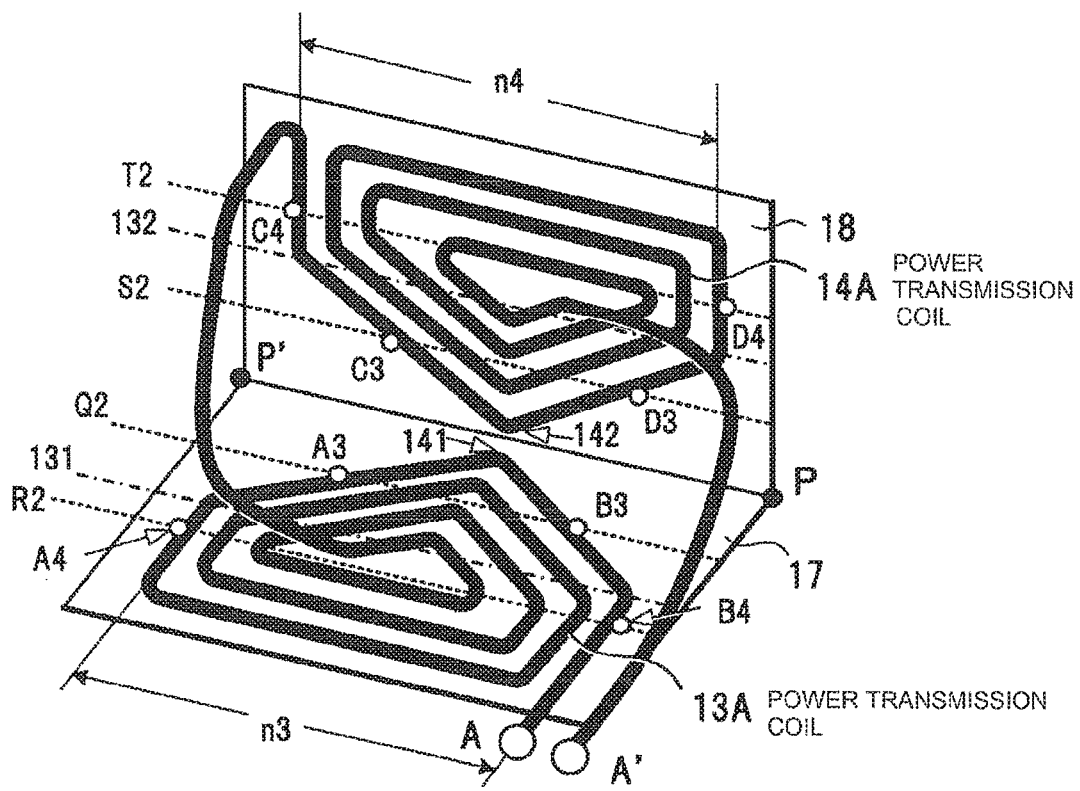
FIG. 13 is a perspective view schematically illustrating configurations of a power transmission coil and a power reception coil according to a second embodiment.

FIG. 13 is a perspective view schematically illustrating configurations of power transmission coils 13A and 14A. As illustrated in FIG. 13, the power transmission coils 13A and 14A which are respectively disposed along the L-shaped two surfaces 17 and 18 (first and second surfaces) of the power transmission device 10, are connected in series to each other. Here, straight lines Q2 and R2 are assumed which are parallel to the straight line P-P' and are spaced apart from each other with predetermined gaps in the surface 17 including the power transmission coil 13A. The straight line R2 is a straight line which is located at a position more distant than the straight line Q2 from the straight line P-P'. In addition, intersections between the straight line Q2 and an outer edge portion of the power transmission coil 13A are set to A3 and B3, and intersections between the straight line R2 and the outer edge portions of the power transmission coil 13A are set to A4 and B4. In this case, the power transmission coil 13A is formed so as to satisfy a relationship of (line segment A3-B3)≥(line segment A4-B4). In other words, the power transmission coil 13A is formed so that a width of the coil increases while becoming distant from the straight line P-P', but is formed so that the width of the coil does not increase and is substantially constant with a boundary at a certain position (for example, a straight line 131 of FIG. 13).

In the same manner as the power transmission coil 13A, the power transmission coil 14A is also formed so that a width of the coil increases while becoming distant from the straight line P-P', but is formed so that the width of the coil does not increase and is substantially constant with a boundary at a certain position (for example, a straight line 132 of FIG. 13). Straight lines S2 and T2 are assumed which are parallel to the straight line P-P' and are spaced apart from each other with predetermined gaps in the surface 18 including the power transmission coil 14A. The straight line T2 is a straight line which is located at a position more distant than the straight line S2 from the straight line P-P'. In addition, intersections between the straight line S2 and an outer edge portion of the power transmission coil 14A are set to C3 and D3, and intersections between the straight line T2 and the outer edge portions of the power transmission coil 14A are set to C4 and D4.

In this case, the power transmission coil 14A is formed so as to satisfy a relationship of (line segment C3-D3)≤(line segment C4-D4). In other words, the power transmission coil 14A is formed so that a width of the coil increases while becoming distant from the straight line P-P', but is formed so that the width of the coil does not increase and is substantially constant with a boundary at a certain position (for example, the straight line 132 of FIG. 13).

In other words, the power transmission coils 13A and 14A are planar coils which are respectively symmetrically disposed on the first surface 17 and the second surface 18 inside the casing 16 with respect to the intersection (P-P') between the first surface 17 and the second surface 18, and include extension regions (a region from a vertex 141 to the straight line 131 or a region from a vertex 142 to the straight line 132) in which an occupation area of the coil gradually increases while becoming distant from a part close to the intersection (P-P').

End portions A and A' which are drawn from the power transmission coils 13A and 14A correspond to the terminals A and A' of the power transmission device 10 of FIG. 1A. In addition, the end portions A and A' may be exchanged with each other. Further, the power transmission coils 13A and 14A are ones in which a single copper line, a plurality of litz wires, or the like are wound in a planar shape along the two surfaces 17 and 18. Alternatively, a print coil formed on a rigid or flexible print board may be used.

Figure 14:
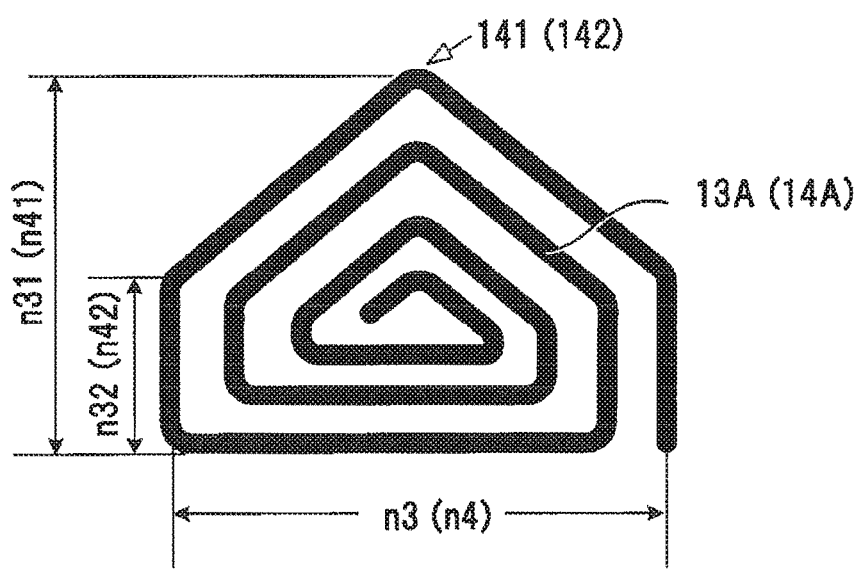
FIG. 14 is a plan view in which the power transmission coil is viewed from the top.

FIG. 14 is a plan view in which the power transmission coil 13A according to the second embodiment is viewed from the top. The power transmission coil 14A also has the same configuration, and the power transmission coil 13A (14A) is formed in a spiral coil pattern, for example, by using a print pattern, and an exterior dimension is n3 (n4) in width and n31 (n41) in height. In addition, a length of a part where the width n3 or n4 of the power transmission coil 13A (14A) is constant is n32 (n42).

Figure 15:
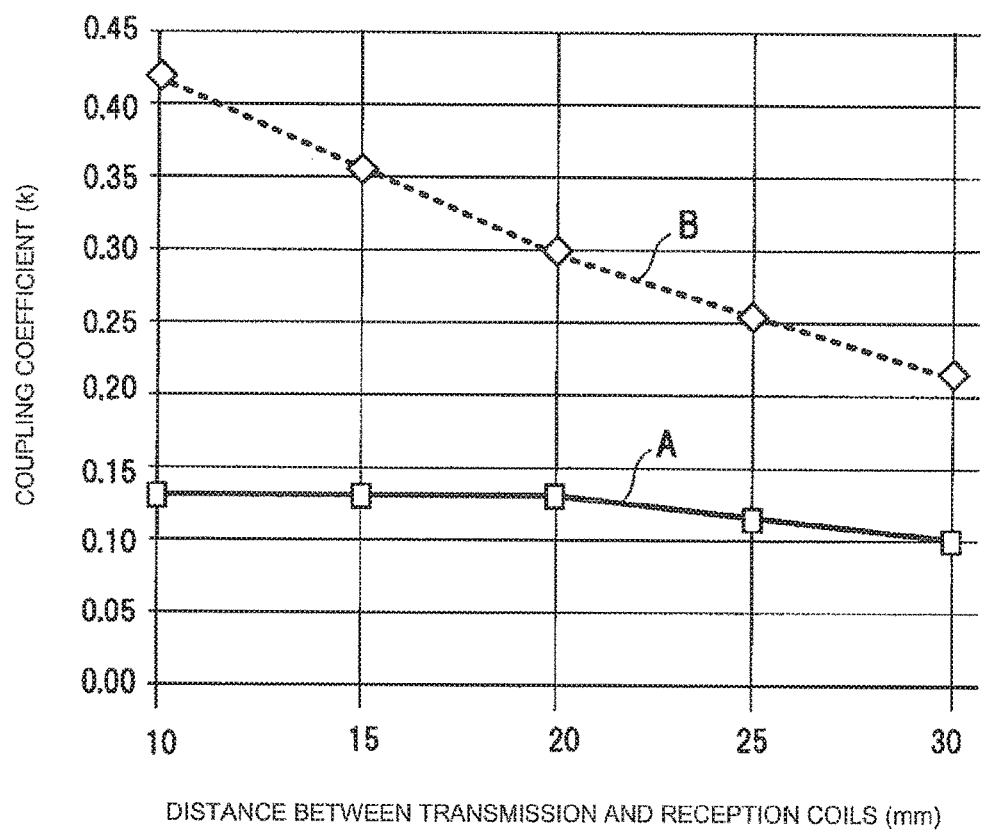
FIG. 15 is a characteristic diagram illustrating a relationship between a distance between transmission and reception coils and a coupling coefficient k in the second embodiment and a general example.

FIG. 15 is a diagram illustrating a result of measuring a variation in the coupling coefficient k when the power transmission coils 13A and 14A and the power reception coil 22 according to the second embodiment are used. Each of the power transmission coils 13A and 14A has a shape as illustrated in FIG. 14, and are formed, for example, by using a print pattern, and exterior dimensions of spiral coil patterns are n3=n4=120 mm, and n31=n41=90 mm. Each vertex 141 or 142 of the coils is disposed at a location close to the straight line P-P' as illustrated in FIG. 13, and the length n32 (n42) where the width n3 (n4) is constant is about 40 mm.

In this case, each inductance value measured at 100 kHz is about 0.87 μH, and a total of about 1.74 μH is obtained when the power transmission coil 13A and the power transmission coil 14A are connected in series to each other by using a copper line or the like and are viewed from the end portions A and A'.

For convenience of description, a direction in which the power reception coil 22 is moved is set to be the same as the Y direction illustrated in FIG. 4 in the same manner as in the first embodiment.

As indicated by a solid line A of FIG. 15, in the configuration of the second embodiment, the coupling coefficient k only varies in a range of 0.132 to 0.096 and thus varies in a range of 0.114±13% even if a distance between the transmission and reception coils varies in a range of 10 mm to 30 mm. On the other hand, as described in FIG. 10, in the related art using the plate-shaped power transmission coil 33 and the power reception coil 41, the coupling coefficient k is 0.42 if a distance between the transmission and reception coils is 10 mm, the coupling coefficient k decreases to 0.21 if a distance between the transmission and reception coils is 30 mm, and thus the coupling coefficient k varies in a range of 0 0.315±33% if a distance between the transmission and reception coils is in a range of 10 mm to 30 mm. Therefore, also when the power transmission coils 13A and 14A according to the second embodiment are used, it can be seen that a variation rate of the coupling coefficient k is about ⅓ of the characteristic B of the related art, and thus the variation rate of the coupling coefficient k is considerably reduced.

In addition, in the second embodiment, the description has been made of an example in which the power transmission coils 13A and 14A are connected in series to each other. If an inductance value necessary for resonance of the resonance element 15 illustrated in FIG. 1 is set to L, the power transmission coils are connected in series to each other, and thus each inductance value of the power transmission coil 13A and the power transmission coil 14A is L/2. However, each inductance value is not limited to L/2, and a sum of inductance values of the power transmission coils 13A and the power transmission coil 14A may be L. In addition, the description has been made of an example in which the power transmission coils 13A and 14A have the same shape, but shapes thereof are not necessarily required to be the same as each other.

A shape of the power transmission coil which allows a variation of the coupling coefficient k to be reduced is not limited to a triangular shape described in the first embodiment, or a nearly hexagonal shape (abase shape of a baseball) described in the second embodiment. Particularly, for example, if there is an element in which a width of a coil increases while becoming distant from the straight line P-P', an effect of reducing variation in the coupling coefficient k can be achieved.

Figure 16:
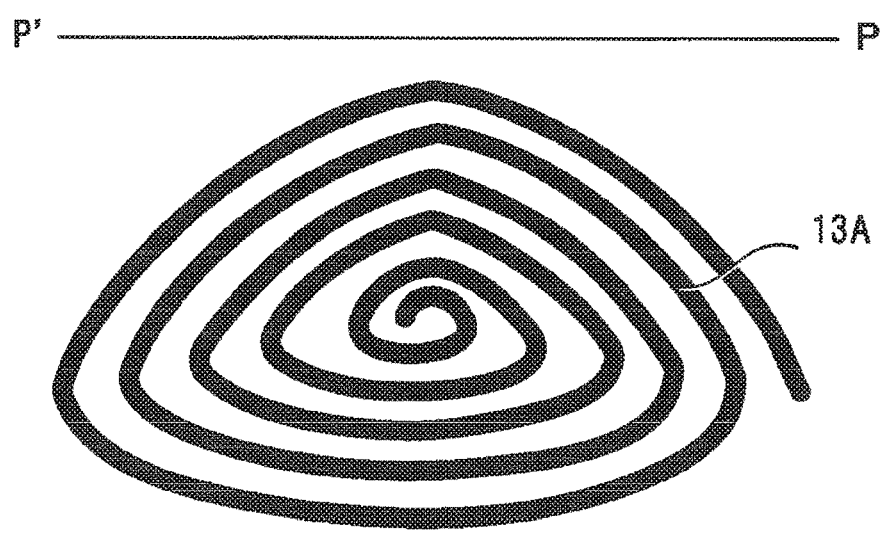
FIG. 16 is a plan view illustrating a modification example of the power transmission coil.
Figure 17:
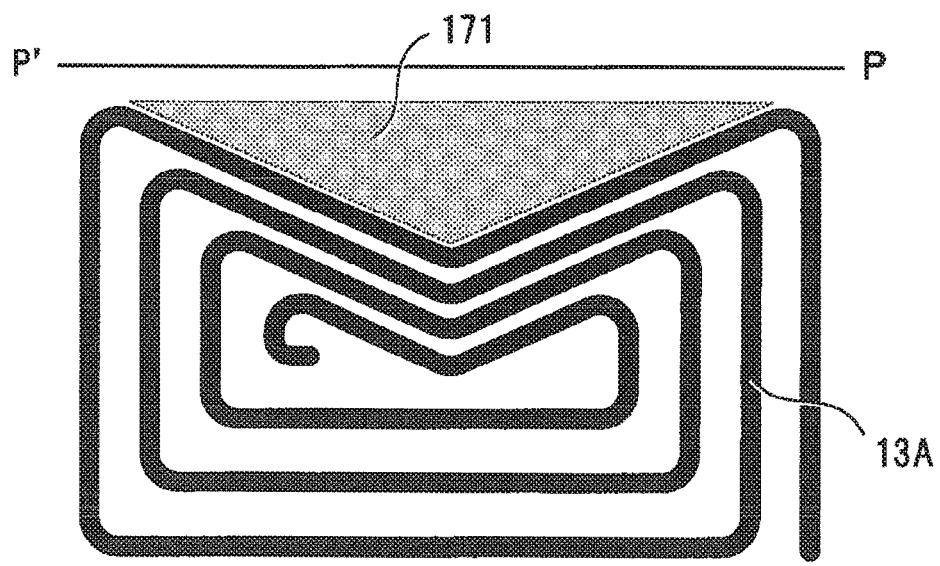
FIG. 17 is a plan view illustrating another modification example of the power transmission coil.

FIGS. 16 and 17 are plan views illustrating modification examples of the power transmission coil 13A (14A) according to the second embodiment. FIG. 16 is a diagram in which the power transmission coil 13A disposed along the surface 17 is viewed from the top. An exterior of the power transmission coil 13A is a curved shape, and a width of the coil increases while becoming distant from a part close to the straight line P-P'.

FIG. 17 is a plan view illustrating another modification example of the power transmission coil 13A (14A) according to the second embodiment. A width of an exterior of the power transmission coil 13A is constant even if distant from the straight line P-P', but a region 171 where there is no coil wire is provided at a location close to the straight line P-P'.

Therefore, the same effect as an effect in which a width of the coil increases while becoming distant from the straight line P-P' is achieved.

According to the embodiment described above, a non-contact power transmission apparatus can be provided in which the coupling coefficient k does not almost vary even if a distance between resonance elements of the power transmission device 10 and the power reception device 20 varies.

Third Embodiment

In the above-described embodiments, the description has been made of an example in which the power transmission coil 13 and the power transmission coil 14 are connected in series to each other, but the third embodiment relates to an example in which the power transmission coil 13 and the power transmission coil 14 are connected in parallel to each other.

Figure 18:
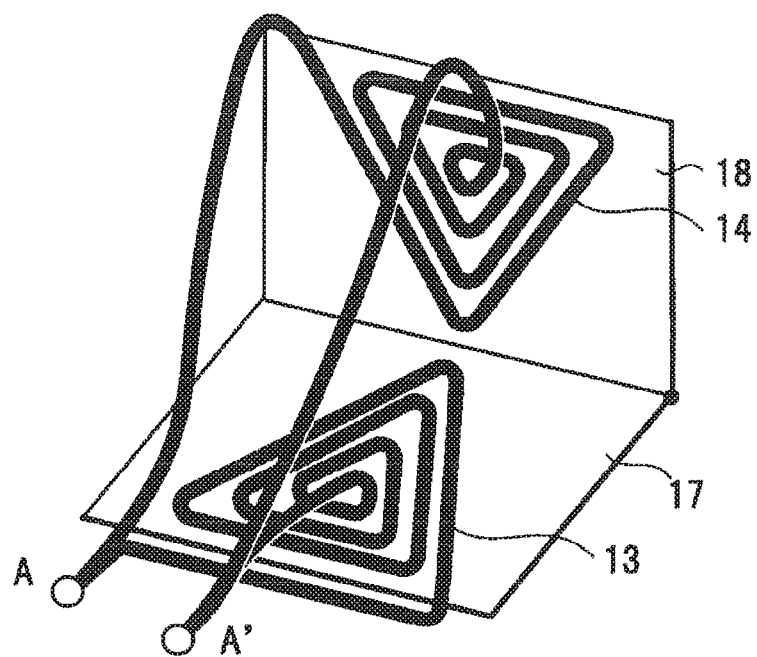
FIG. 18 is a perspective view illustrating a power transmission coil according to a third embodiment.

FIG. 18 illustrates an example in which the power transmission coil 13 and the power transmission coil 14 are connected in parallel to each other. Even if the power transmission coil 13 and the power transmission coil 14 are connected in parallel to each other, a characteristic is obtained in which the coupling coefficient k hardly varies even if a distance between the coils varies, in the same manner as in the series connection. However, in order that an inductance value viewed from the terminal A of FIG. 1 is the inductance value L which is the same as in the series connection, inductance values of the power transmission coil 13 and the power transmission coil 14 are required to be four times (each of the power transmission coil 13 and the power transmission coil 14 is 2 L) larger than in the series connection. Therefore, the series connection of the power transmission coil 13 and the power transmission coil 14 is advantageous in that the number of turns of the coils is smaller, but parallel connection may be employed.

Figure 19A:
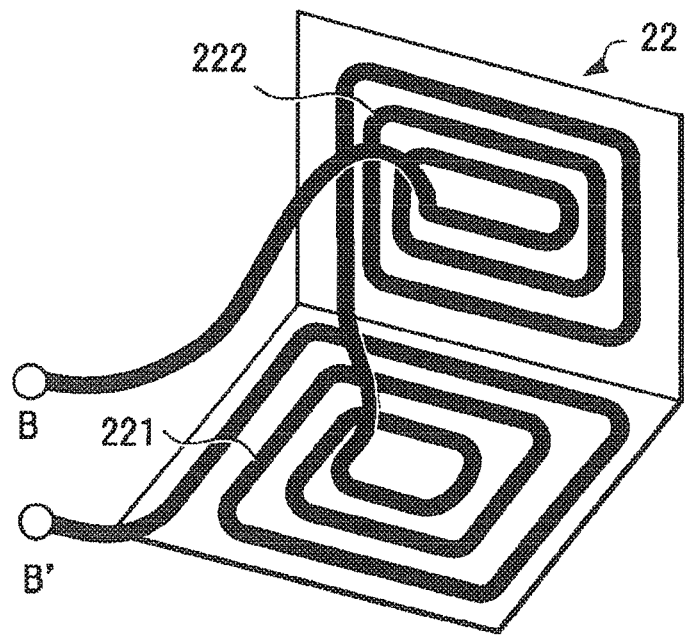
FIGS. 19A and 19B are perspective views illustrating a power reception coil.
Figure 19B:
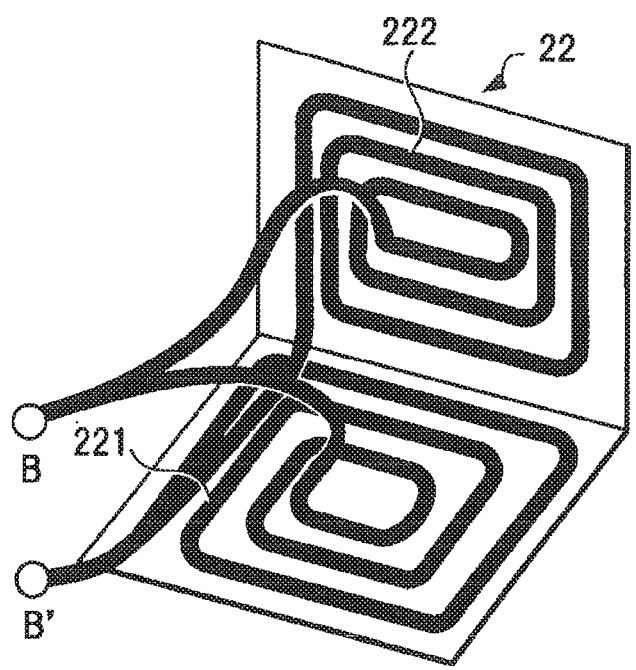

Meanwhile, the power reception coil 22 has not only a shape in which a single coil is folded as illustrated in FIG. 2B, but may also be formed as illustrated in FIGS. 19A and 19B by connecting two coils in series or in parallel to each other.

FIG. 19A illustrates an example in which two coils 221 and 222 are connected in series to each other as the power reception coil 22. FIG. 19B illustrates an example in which two coils 223 and 224 are connected in parallel to each other as the power reception coil 22. In both of the cases of FIGS. 19A and 19B, an inductance value of each coil or a value of the resonance capacitor 21 is adjusted so that a self resonance frequency of the resonance element 23 formed by the resonance capacitor 21 illustrated in FIG. 1 and the power reception coils 221 and 222 (or 223 and 224) is substantially the same as a self resonance frequency of the resonance element 15 for transmitting power.

Fourth Embodiment

In a fourth embodiment, a shape of the casing of the power transmission device 10 is changed. When the power reception device 20 is placed on the power transmission device 10, if the power reception device 20 is placed at an appropriate position, an appropriate coupling coefficient k is obtained, and thus power can be normally transmitted (refer to FIG. 3). However, if a position of the power reception device 20 considerably deviates relative to the power transmission device 10, the coupling coefficient k is reduced, and, as a result, the power which can be transmitted is reduced.

Figure 20:
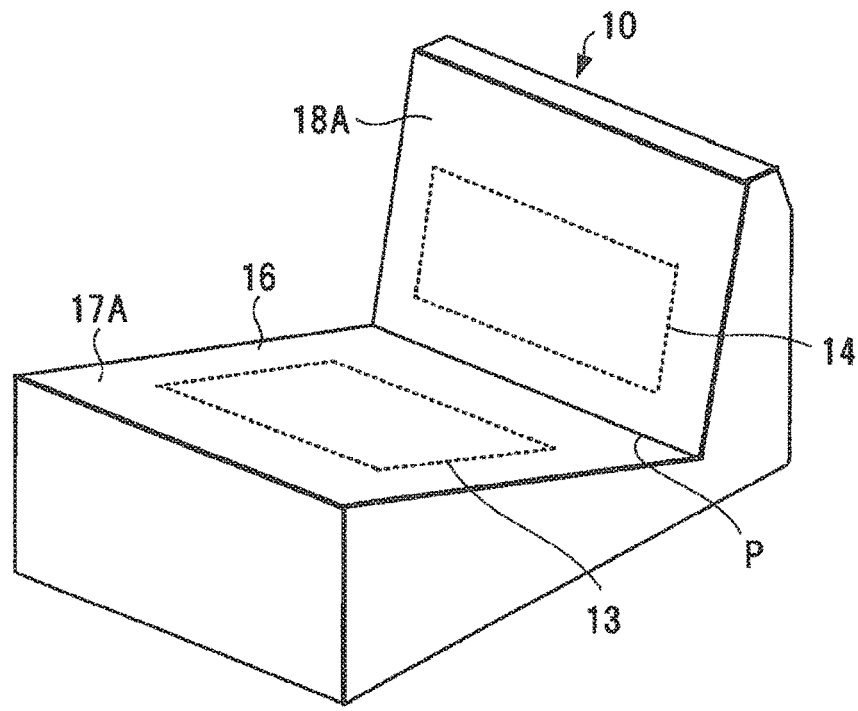
FIG. 20 is a perspective view illustrating a power transmission device in a power transmission apparatus according to a fourth embodiment.

In the fourth embodiment, the power transmission device 10 has a shape as illustrated in FIG. 20 in order to prevent power from not being normally transmitted due to positional deviation of the power reception device 20.

FIG. 20 is a perspective view illustrating the power transmission device 10 according to the fourth embodiment. In other words, in the power transmission device 10, an angle formed between a surface 17A and a surface 18A of the casing 16 is an approximately right angle, the surface 17A is tilted with respect to a horizontal plane, and the surface 18A is tilted with respect to a vertical plane. A part P where the surface 17A and the surface 18A are in contact with each other is located in a low position, and the power transmission coils 13 and 14 are respectively disposed along the surfaces 17A and 18A. If the power reception device 20 such as a portable apparatus is placed on the power transmission device 10, the surface 17A is tilted, and thus the power reception device 20 is slid along the surface 17A in a direction of the surface 18A by gravity so as to come into contact with the surface 18A.

Figure 21:
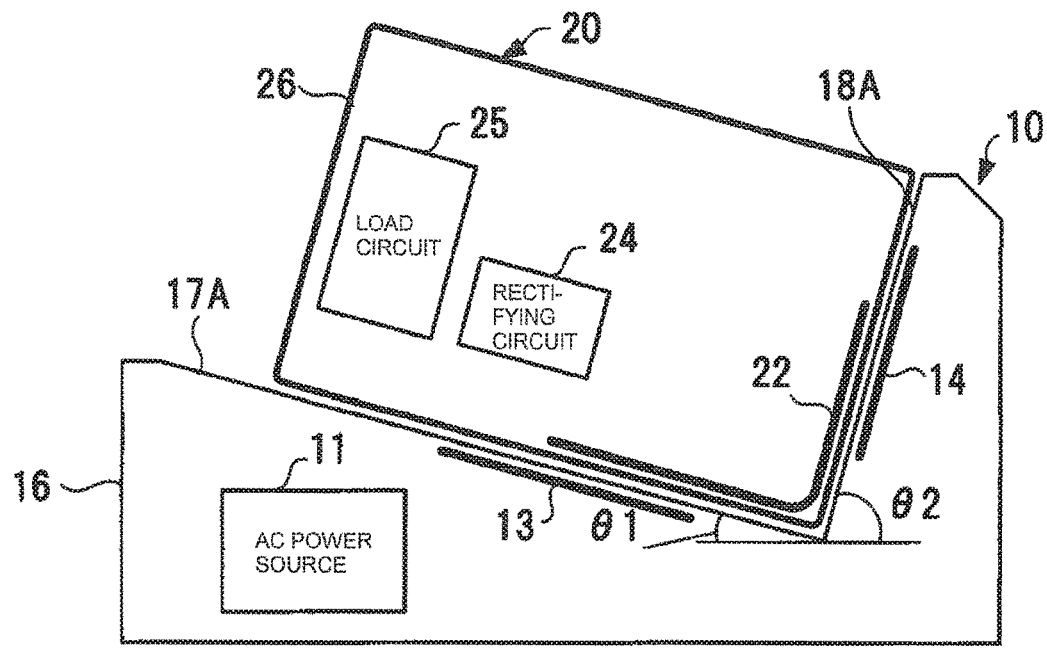
FIG. 21 is a configuration diagram illustrating the power transmission device and a power reception device.

FIG. 21 is a cross-sectional view illustrating that the power reception device 20 is placed on the power transmission device 10 of FIG. 20. The power reception device 20 includes the power reception coil 22, the rectifying circuit 24, the load circuit 25, and the like, and a bottom and a side surface of the power reception device 20 respectively come into contact with the surface 17A and the surface 18A of the power transmission device 10.

An angle θ1 of the surface 17A of the power transmission device 10 with respect to the horizontal plane may be an angle at which the power reception device 20 placed on the power transmission device 10 is naturally slid down along the surface 17A, and may be equal to or greater than 20 degrees to 30 degrees although the angle may be different depending on the material of the power transmission device 10 or the power reception device 20. An angle θ2 of the surface 18A with respect to the horizontal plane is (90 degrees minus θ1), and is equal to or smaller than 60 degrees to 70 degrees. As exemplary cases, each of the angles θ1 and θ2 may be 45 degrees, or the angles θ1 and θ2 may be respectively 30 degrees and 60 degrees, or 60 degrees and 30 degrees, but other combinations may be employed. In addition, an angle between the surface 17A and the surface 18A is not limited to a right angle, and may be an angle suitable for a shape of the power reception device 20.

Further, the power reception device 20 such as a portable apparatus is frequently used in a state of being put into a case such as a soft case or a carrying case in order to carry or protect the portable apparatus. In the fourth embodiment, a positional relationship between the power transmission coils 13 and 14 and the power reception coil 22 can be appropriately maintained even in a state in which the power reception device 20 is put into a case.

Figure 22:
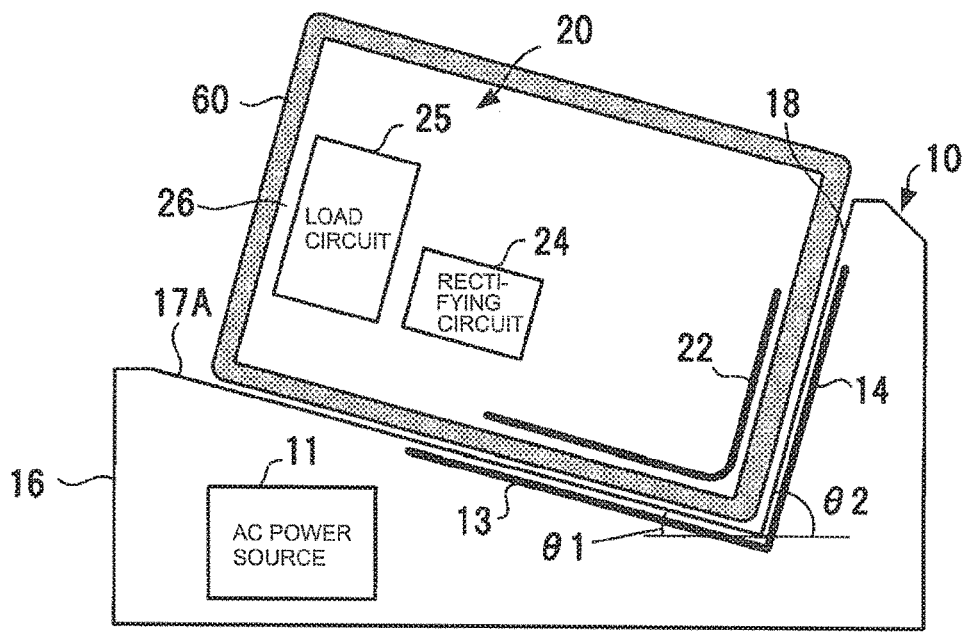
FIG. 22 is a configuration diagram illustrating another example of the power transmission device and the power reception device.

FIG. 22 is a cross-sectional view illustrating a state in which the power reception device 20 is put into a soft case 60 and is placed on the power transmission device 10. Since the surface 17A of the power transmission device 10 is tilted, the power reception device 20 put into the soft case 60 is slid down along the surface 17A so that the soft case 60 comes into contact with the surface 18A.

A positional relationship between the power transmission coils 13 and 14 and the power reception coil 22 becomes a positional relationship which allows the coupling coefficient k to be an appropriate value, that is, the power transmission coils 13 and 14 and the power reception coil 22 are not separated from each other excessively, and an area of the power reception coil 22 facing the power transmission coils 13 and 14 is sufficiently secured. Therefore, power can be transmitted from the power transmission device 10 to the power reception device 20 with high efficiency.

Figure 23:
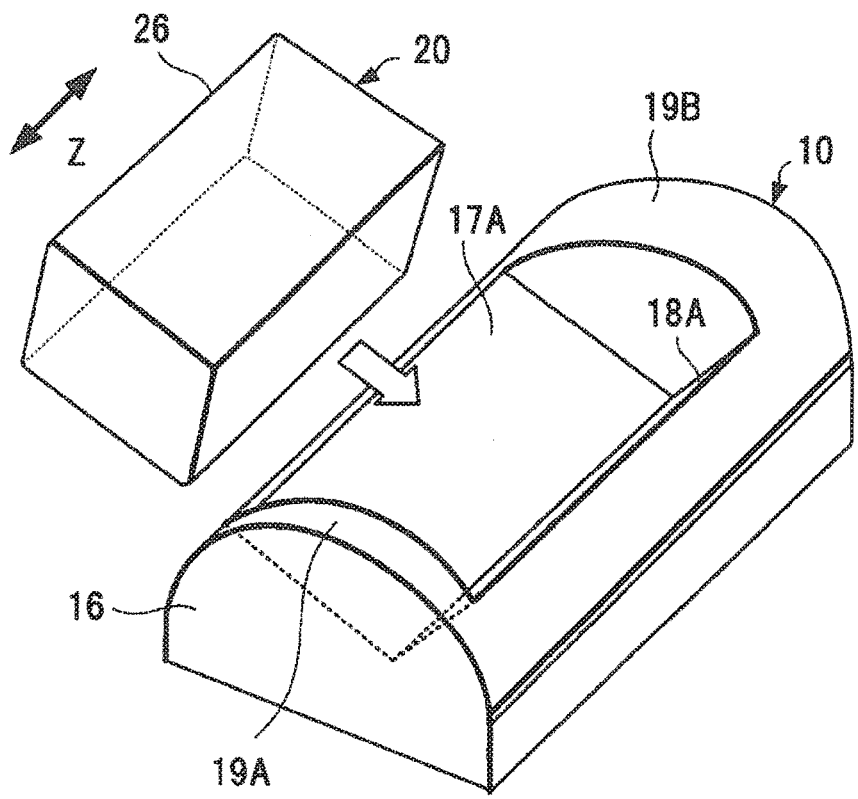
FIG. 23 is a perspective view illustrating a power transmission device and a power reception device according to a modification example.

FIG. 23 is a perspective view illustrating a modification example of the fourth embodiment. In other words, the power transmission device 10 is the same as the power transmission device 10 of FIG. 20 in that the surface 17A of the casing 16 is tilted with respect to the horizontal plane, and the surface 18A is tilted with respect to the vertical plane. In addition, guide faces 19A and 19B are provided in the casing 16 in order to restrict a position of the power reception device 20 in a width direction (an arrow Z direction).

In FIG. 23, if the power reception device 20 such as a portable apparatus is placed on the power transmission device 10, the surface 17A is tilted with respect to the horizontal plane, and thus the power reception device 20 is slid along the surface 17A in a direction of the surface 18A by gravity so as to come into contact with the surface 18A. In addition, both sides of the power reception device 20 are guided by the guide faces 19A and 19B so as to be positioned. Therefore, the power transmission coils 13 and 14 and the power reception coil 22 are accurately maintained in a positional relationship which allows the coupling coefficient k to be an appropriate value.

According to at least one of the above-described embodiments, a noncontact power transmission apparatus can be provided in which a coupling coefficient k does not almost vary even if a distance between the resonance elements of the power transmission device 10 and the power reception device 20 varies.

Several embodiments of the invention have been described, but the embodiments are only an example, and are not intended to limit the scope of the invention. The embodiments can be implemented in other various forms, and various omissions, modifications, and alterations may occur within the scope without departing from the spirit of the invention. The embodiments and the modifications thereof are included in the invention recited in the claims and the equivalents thereof as being included in the scope or the spirit of the invention.

What is claimed is:

1. A power transmission apparatus comprising:
a first main body including a first surface inclined with respect to a horizontal plane, and a second surface adjacent to the first surface and being substantially in a perpendicular relation with respect to the first surface, the first surface is lower toward a line of intersection on which the first surface and the second surface cross;
a first power transmission coil disposed on the first surface and having a tapered shape toward the line of intersection;
a second power transmission coil disposed on the second surface, having a tapered shape toward the line of intersection, and disposed symmetrically to the first power transmission coil with respect to the line of intersection;
an AC power source that supplies AC power to the first power transmission coil and the second power transmission coil;
a second main body including a third surface and a fourth surface which respectively face the first surface and the second surface;
a power reception coil disposed across the third surface and the fourth surface; and a rectifying circuit present in the second main body, and the rectifying circuit rectifies AC power inducted in the power reception coil.

2. The apparatus according to claim 1, wherein a coil width of the first power transmission coil increases as the first power transmission coil becomes more distant from the line of intersection.

3. The apparatus according to claim 2, wherein a coil width of the second power transmission coil increases as the second power transmission coil becomes more distant from the line of intersection.

4. The apparatus according to claim 1, wherein the first power transmission coil and the second power transmission coil are connected in series.

5. The apparatus according to claim 1, wherein the first power transmission coil and the second power transmission coil are connected in parallel.

6. The apparatus according to claim 1, wherein the first power transmission coil and the second power transmission coil respectively have same inductance values.

7. The apparatus according to claim 1, wherein the first power transmission coil and the second power transmission coil have a same shape.

8. The apparatus according to claim 1, wherein a maximum width of the first power transmission coil and the second power transmission coil and a maximum width of the power reception coil are approximate to each other.

9. The apparatus according to claim 8, wherein the first power transmission coil and the second power transmission coil are triangular and the power reception coil is square.

10. The apparatus according to claim 9, wherein an external shape of the first power transmission coil and the second power transmission coil is a curved shape.

11. A power transmission device comprising:
a first main body including a first surface inclined with respect to a horizontal plane and a second surface adjacent to the first surface and being substantially in a perpendicular relation with respect to the first surface, the first surface is lower toward a line of intersection on which the first surface and the second surface cross;
a first power transmission coil disposed on the first surface and having a tapered shape toward the line of intersection;
a second power transmission coil disposed on the second surface, having a tapered shape toward the line of intersection, and disposed symmetrically to the first power transmission coil with respect to the line of intersection; and
an AC power source that supplies AC power to the first power transmission coil and the second power transmission coil.

12. The device according to claim 11, wherein a first power transmission coil width of the first power transmission coil increases as the first power transmission coil becomes more distant from the line of intersection.

13. The device according to claim 11, wherein a second power transmission coil width of the second power transmission coil increases as the second power transmission coil becomes more distant from the line of intersection.

14. The device according to claim 11, wherein the first power transmission coil and the second power transmission coil are connected in series.

15. The device according to claim 11, wherein the first power transmission coil and the second power transmission coil are connected in parallel.

16. The device according to claim 11, wherein the first power transmission coil and the second power transmission coil have a same shape.

17. The device according to claim 11, wherein a maximum width of the first power transmission coil and the second power transmission coil and a maximum width of a power reception coil are same to each other.

* * * * *